(12) United States Patent
Nakatani et al.

(10) Patent No.: US 9,990,704 B2
(45) Date of Patent: Jun. 5, 2018

(54) IMAGE PROCESSING APPARATUS AND IMAGE PROCESSING METHOD

(71) Applicant: CANON KABUSHIKI KAISHA, Tokyo (JP)

(72) Inventors: Toshiki Nakatani, Kawasaki (JP); Masaharu Yamagishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 14/728,191

(22) Filed: Jun. 2, 2015

(65) Prior Publication Data

US 2015/0356904 A1    Dec. 10, 2015

(30) Foreign Application Priority Data

Jun. 5, 2014  (JP) .................................. 2014-116603
Nov. 14, 2014 (JP) .................................. 2014-231639

(51) Int. Cl.
*G09G 5/10* (2006.01)
*G06T 5/00* (2006.01)
(Continued)

(52) U.S. Cl.
CPC .............. *G06T 5/009* (2013.01); *G06T 5/50* (2013.01); *G09G 5/377* (2013.01);
(Continued)

(58) Field of Classification Search
None
See application file for complete search history.

(56) References Cited

U.S. PATENT DOCUMENTS

| 2012/0183210 A1 | 7/2012 | Zheng et al. |
| 2012/0236020 A1* | 9/2012 | Paris ....................... G06T 5/009 |
| | | 345/589 |
| 2014/0333673 A1* | 11/2014 | Cho ......................... G09G 5/02 |
| | | 345/660 |

FOREIGN PATENT DOCUMENTS

| CN | 101569204 A | 10/2009 |
| CN | 102257531 A | 11/2011 |
| | (Continued) | |

OTHER PUBLICATIONS

The above patent documents were cited in a European Search Report dated Oct. 5, 2015, which is enclosed, that issued in the corresponding European Patent Application No. 15166704.5.
(Continued)

*Primary Examiner* — Ifedayo Iluyomade
(74) *Attorney, Agent, or Firm* — Cowan, Liebowitz & Latman, P.C.

(57) ABSTRACT

An image processing apparatus according to the present invention includes: an obtaining unit configured to obtain a brightness range value; and a generating unit configured to generate a display-image data on the basis of the brightness range value obtained by the obtaining unit, wherein the generating unit generates the display-image data on the basis of two or more of first image data, second image data, and brightness difference data such that, when the brightness range value obtained by the obtaining unit is within a predetermined range, a maximum gradation value of the dynamic range of the generated display-image data steadily approaches a maximum gradation value of the dynamic range of the first image data as the brightness range value obtained by the obtaining unit decreases.

26 Claims, 26 Drawing Sheets

(51) Int. Cl.
*G06T 5/50* (2006.01)
*G09G 5/377* (2006.01)

(52) U.S. Cl.
CPC .............. *G06T 2207/20208* (2013.01); *G06T 2207/20221* (2013.01); *G09G 2320/0626* (2013.01); *G09G 2320/0666* (2013.01); *G09G 2320/0673* (2013.01)

(56) References Cited

FOREIGN PATENT DOCUMENTS

| | | |
|---|---|---|
| CN | 103430212 A | 12/2013 |
| CN | 104143322 A | 11/2014 |
| JP | 2003-295837 A | 10/2003 |
| JP | 2011-193511 A | 9/2011 |
| WO | 2008/077273 A1 | 7/2008 |
| WO | 2012/127401 A1 | 9/2012 |

OTHER PUBLICATIONS

The above references were cited in a Oct. 27, 2017 Chinese Office Action, which is enclosed with an English Translation, that issued in Chinese Patent Application No. 201510303170.1.

\* cited by examiner

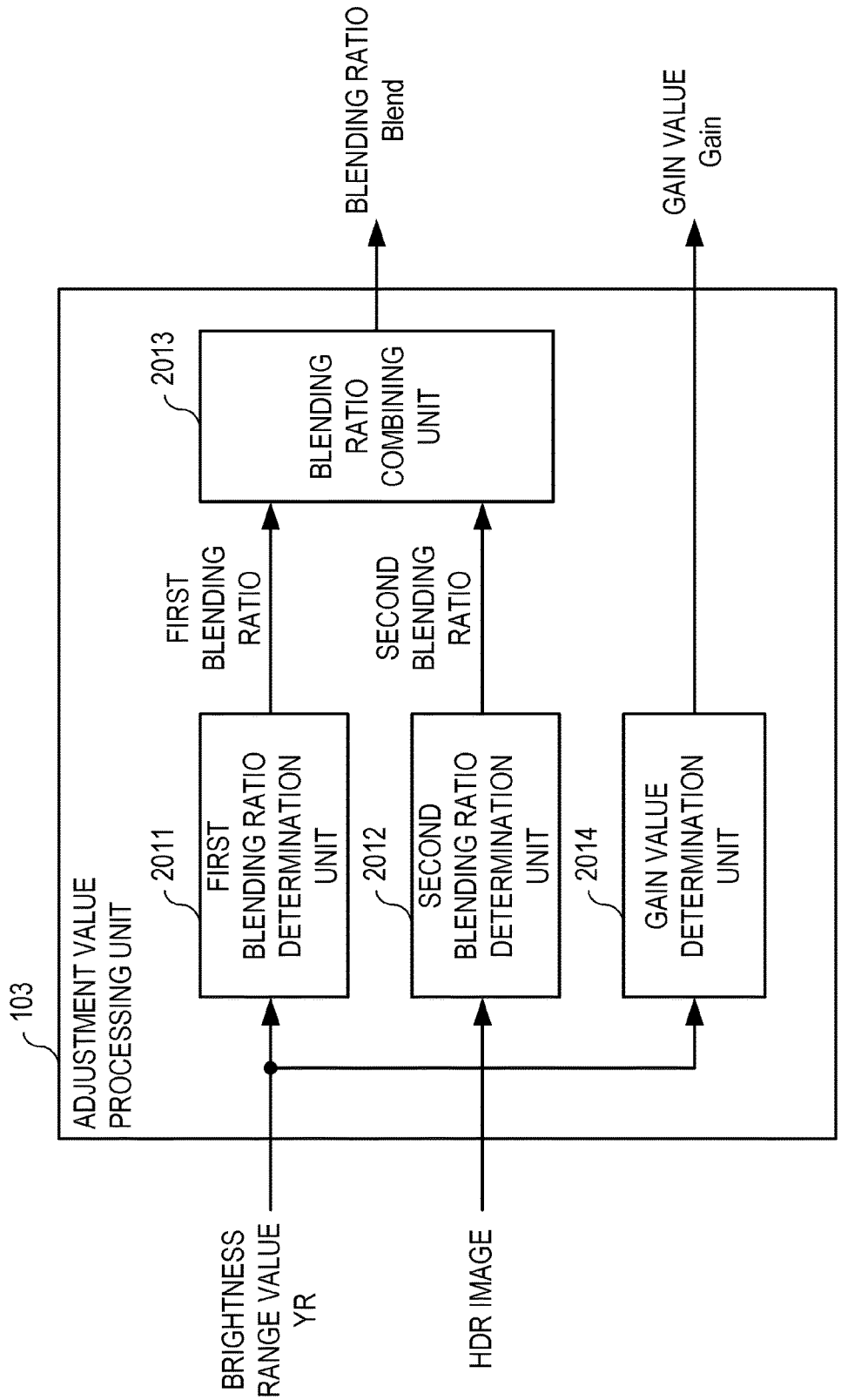

FIG. 23D
IMAGE OBTAINED
BY CLIPPING
GRADATION VALUES
OF HDR IMAGE
THAT ARE LARGER
THAN 2.5 TO 2.5
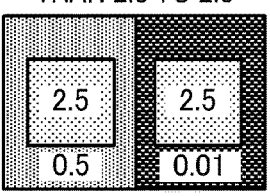
BRIGHTNESS RANGE OF IMAGE
OBTAINED BY CLIPPING
GRADATION VALUES OF HDR IMAGE
THAT ARE LARGER THAN 2.5 TO 2.5
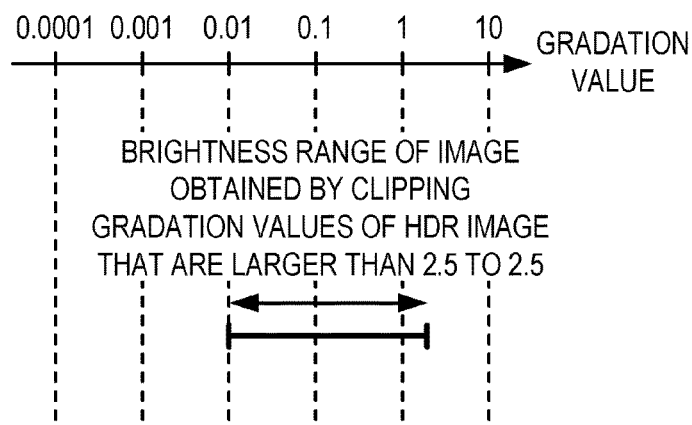
FIG. 23E
IMAGE OBTAINED
BY COMBINING
HDR IMAGE AND BASE IMAGE
AT Blend=0.5
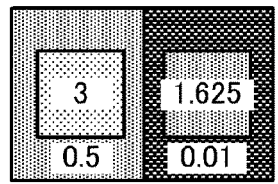
BRIGHTNESS RANGE OF IMAGE
OBTAINED BY COMBINING
HDR IMAGE AND BASE IMAGE
AT Blend=0.5
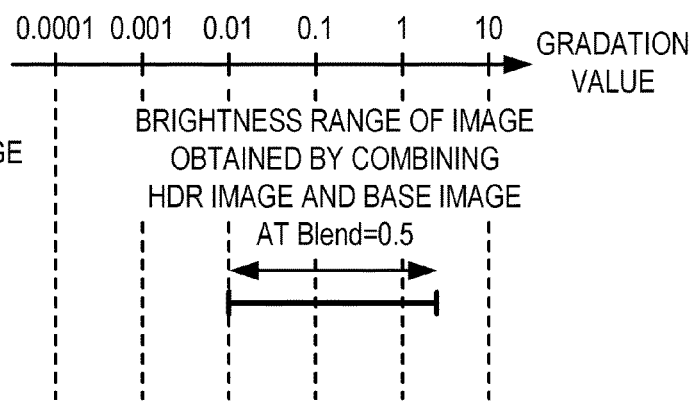

IMAGE PROCESSING APPARATUS AND IMAGE PROCESSING METHOD

BACKGROUND OF THE INVENTION

Field of the Invention

The present invention relates to an image processing apparatus and an image processing method.

Description of the Related Art

Recently, high dynamic range (HDR) display, which is performed using multi-bit image data to obtain a display image (an image displayed on a screen) having a wider dynamic range than a conventional display image, is growing in popularity.

As a method of recording HDR image data (multi-bit image data) having a wide dynamic range, a method of dividing the HDR image data into base image data and brightness difference data and then recording the base image data and the brightness difference data has been proposed (Japanese Patent Application Publication No. 2011-193511). In other words, a format using base image data and brightness difference data has been proposed as a data format for HDR image data.

The base image data are image data constituted by a small number of bits, which are obtained by gradation-compressing (down-sampling) the HDR image data. The base image data are approximately 8-bit gradation image data, for example. A creator of image data determines a dynamic range of the base image data such that an important gradation range of the image data, within the wide dynamic range (a brightness range) of the HDR image data, is included in the dynamic range of the base image data.

The brightness difference data are data expressing a correspondence relationship between gradation values (brightness values) of the base image data and gradation values of the HDR image data.

The HDR image data can be obtained by converting the gradation values of the base image data into the gradation values of the HDR image data using the brightness difference data.

Various techniques for adjusting the dynamic range of image data in accordance with the content of the image data, user preferences, and so on have also been proposed.

For example, an image display apparatus that determines an average brightness level of input image data, lowers a brightness level of the input image data when the average brightness level is high, and raises the brightness level of the input image data when the average brightness level is low has been proposed (Japanese Patent Application Publication No. 2003-295837).

However, when the brightness level of HDR image data is modified using the technique described in Japanese Patent Application Publication No. 2003-295837, high gradation values of the HDR image data are limited to an upper limit value, and therefore blown-out highlights may appear on the display image. Furthermore, low gradation values of the HDR image data are limited to a lower limit value, and therefore blocked-up shadows may appear on the display image. As a result, a display image having a low contrast may be obtained.

Therefore, when the technique described in Japanese Patent Application Publication No. 2003-295837 is used, it may be impossible to obtain a display image that is pleasing to a user.

The problem described above occurs likewise when the dynamic range of the input image data is adjusted using an arbitrary adjustment value (a brightness range value) corresponding to a user operation.

Further, the user may wish to obtain image data having a dynamic range that is close to the dynamic range of the base image data. In the related art (including the technique disclosed in Japanese Patent Application Publication No. 2003-295837), however, the dynamic range of the HDR image data is adjusted using only the HDR image data as image data. Therefore, when the dynamic range of the HDR image data is adjusted according to the related art, image data having a dynamic range that is far removed from the dynamic range of the base image data are obtained. A case in which the important gradation range of the HDR image data is a gradation range on a high gradation side (a high gradation range) and the dynamic range of the base image data is a gradation range including the high gradation range, for example, may be envisaged. In this case, according to the related art, the high gradation range cannot be learned, and therefore the dynamic range of the HDR image data is adjusted to a gradation range not including the high gradation range.

With the related art, therefore, when the user wishes to obtain image data having a dynamic range that is close to the dynamic range of the base image data, image data having a dynamic range that is far removed from the dynamic range of the base image data are obtained instead.

As described above, according to the related art, the dynamic range of the input image data cannot be adjusted favorably.

SUMMARY OF THE INVENTION

The present invention provides a technique with which a dynamic range of image data can be adjusted favorably.

The present invention in its first aspect provides an image processing apparatus comprising:

an obtaining unit configured to obtain a brightness range value used during processing for adjusting a dynamic range of display-image data; and a generating unit configured to generate the display-image data on the basis of the brightness range value obtained by the obtaining unit, using two or more of first image data, second image data obtained by expanding a dynamic range of the first image data, and brightness difference data expressing a correspondence relationship between gradation values of the first image data and gradation values of the second image data, wherein the generating unit generates the display-image data such that, when the brightness range value obtained by the obtaining unit is within a predetermined range, a maximum gradation value of the dynamic range of the generated display-image data steadily approaches a maximum gradation value of the dynamic range of the first image data as the brightness range value obtained by the obtaining unit decreases.

The present invention in its second aspect provides an image processing method comprising:

an obtaining step of obtaining a brightness range value used during processing for adjusting a dynamic range of display-image data; and a generating step of generating the display-image data on the basis of the brightness range value obtained in the obtaining step, using two or more of first image data, second image data obtained by expanding a dynamic range of the first image data, and brightness difference data expressing a correspondence relationship between gradation values of the first image data and gradation values of the second image data, wherein, in the generating step, the display-image data are generated such that, when the brightness range value obtained in the obtaining step is within a predetermined range, a maximum gradation value of the dynamic range of the generated display-image data steadily approaches a maximum gradation value of the dynamic range of the first image data as the brightness range value obtained in the obtaining step decreases.

The present invention in its third aspect provides a non-transitory computer readable medium that stores a program, wherein the program causes a computer to execute the image processing method.

According to the present invention, the dynamic range of the image data can be adjusted favorably.

Further features of the present invention will become apparent from the following description of exemplary embodiments with reference to the attached drawings.

BRIEF DESCRIPTION OF THE DRAWINGS

FIG. 6 is a view showing an example of a functional configuration of an adjustment value processing unit according to a second embodiment;

FIGS. 23A to 23E are views illustrating effects of the first embodiment.

DESCRIPTION OF THE EMBODIMENTS (First Embodiment)

An image processing apparatus and an image processing method according to a first embodiment of the present invention will be described below.

Note that an example of a case in which the image processing apparatus is an image display apparatus will be described below, but the present invention is not limited thereto, and the image processing apparatus may be an apparatus provided separately to the image display apparatus.

An example in which pixel values of image data are YCbCr values (a combination of a Y value, a Cb value, and a Cr value) and the Y value (a brightness value) is adjusted will be described below, but the present invention is not limited thereto, and instead, the pixel values of the image data may be RGB values (a combination of an R value, a G value, and a B value). In this case, the R value, the G value, and the B value may be adjusted respectively.

Figure 1:
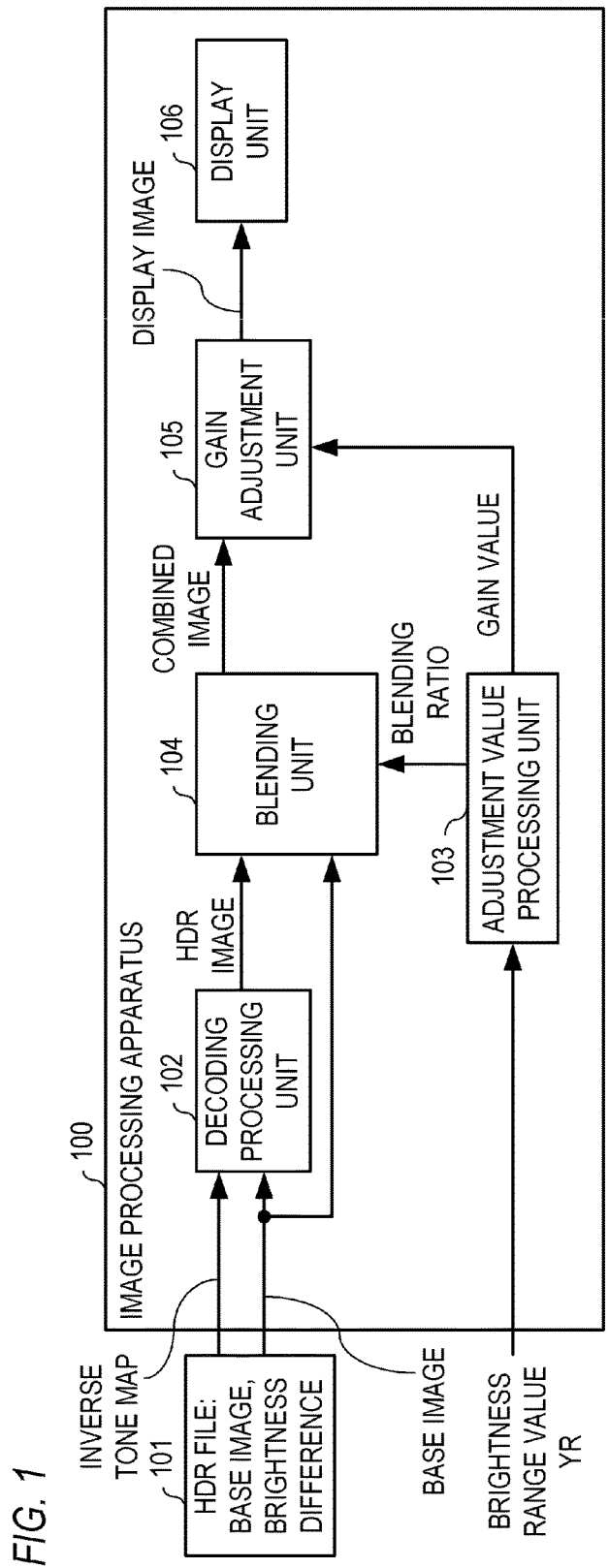
FIG. 1 is a view showing an example of a functional configuration of an image processing apparatus according to a first embodiment.

FIG. 1 is a block diagram showing an example of a functional configuration of an image processing apparatus (an image display apparatus) 100 according to this embodiment.

As shown in FIG. 1, the image processing apparatus 100 includes a decoding processing unit 102, an adjustment value processing unit 103, a blending unit 104, a gain adjustment unit 105, a display unit 106, and so on.

Note that in a case where the image processing apparatus 100 is an apparatus provided separately to an image display apparatus, the display unit 106 is provided in the image display apparatus.

An HDR file 101 and a brightness range value YR are input into the image processing apparatus 100.

The HDR file 101 is a data file including first image data and brightness difference data.

The first image data are image data obtained by gradation-compressing (down-sampling) second image data. The first image data are 8-bit gradation image data, for example. In this embodiment, the first image data will be referred to as "base image data" and the second image data will be referred to as "HDR image data".

The brightness difference data are brightness difference data expressing a correspondence relationship between gradation values of the base image data and gradation values of the HDR image data. The brightness difference data are constituted by brightness ratio data, brightness conversion table data, or the like, for example. The brightness ratio data are data expressing a brightness ratio, which is a ratio between a gradation value of the base image data and a gradation value of the HDR image data, in pixel units (or units of a region constituted by a predetermined number of pixels). More specifically, the brightness ratio data are data expressing a ratio of a gradation value of the HDR image data to a gradation value of the base image data, or an inverse thereof, in pixel units (or units of a region constituted by a predetermined number of pixels). The brightness conversion table data are lookup table data expressing a correspondence relationship between an input gradation value and an output gradation value of range expansion processing for expanding a dynamic range of the base image data. The range expansion processing may also be considered as processing for reproducing a brightness that cannot be fully expressed by the base image data. In this embodiment, brightness conversion table data are used as the brightness difference data.

The base image data are image data generated by performing range reduction processing (image processing for reducing a dynamic range of the HDR image data) using a tone map, for example. The tone map is constituted by lookup table data expressing a correspondence relationship between an input gradation value and an output gradation value of the range reduction processing. The brightness conversion table data, described above, are lookup table data obtained by switching the input gradation values and the output gradation values of the tone map. Accordingly, the brightness conversion table data may also be referred to as an "inverse tone map".

The brightness range value YR is an adjustment value used during processing for adjusting a dynamic range of display-image data. In this embodiment, the brightness range value YR is obtained in accordance with a user operation. The display-image data are image data input into the display unit 106 (the image display apparatus).

Note that the brightness difference data may be data expressing a brightness difference value, which is a difference value obtained by subtracting one of the gradation value of the base image data and the gradation value of the HDR image data from the other, in pixel units (or units of a region constituted by a predetermined number of pixels).

In this embodiment, an example in which the HDR file 101 is obtained from the exterior of the image processing apparatus 100 will be described, but the present invention is not limited thereto, and instead, for example, the image processing apparatus 100 may include a storage unit that stores a plurality of data including the HDR file 101. In this case, the HDR file 101 may be obtained from the storage unit. For example, the HDR file 101 may be selected from the plurality of data stored in the storage unit in response to a user operation, whereby the selected HDR file 101 is obtained from the storage unit.

The decoding processing unit 102 implements range expansion processing using the inverse tone map included in the HDR file 101 on the base image data included in the HDR file 101. As a result, HDR image data (source image data of the base image data) are generated. The decoding processing unit 102 then outputs the generated HDR image data.

When a gradation value of the image data subjected to the range expansion processing is larger than an upper limit value of gradation values that can be displayed by the display unit 106, the decoding processing unit 102 performs limiting processing to limit the gradation value that is larger than the upper limit value to the upper limit value. The gradation values that can be displayed by the display unit 106 may also be considered as gradation values that can be input into the display unit 106. When a gradation value of the image data subjected to the range expansion processing is smaller than a lower limit value of the gradation values that can be displayed by the display unit 106, the decoding processing unit 102 performs limiting processing to limit the gradation value that is smaller than the upper limit value to the lower limit value. In a case where a gradation value of the image data subjected to the range expansion processing is larger than the upper limit value or a gradation value of the image data subjected to the range expansion processing is smaller than the lower limit value, the HDR image data are generated by implementing the range expansion processing and the limiting processing on the base image data.

The display-image data are generated by the adjustment value processing unit 103, the blending unit 104, and the gain adjustment unit 105. In this embodiment, the display-image data are generated on the basis of the obtained (input) brightness range value YR such that when the brightness range value YR changes continuously, the dynamic range of the display-image data also changes continuously.

The adjustment value processing unit 103 obtains the brightness range value YR, and determines a blending ratio Blend and a gain value Gain in accordance with the obtained brightness range value YR. The adjustment value processing unit 103 then outputs the determined blending ratio Blend and gain value Gain.

The blending ratio Blend represents a weighting applied to the gradation values of the HDR image data when the gradation values of the base image data and the gradation values of the HDR image data are combined. A weighting applied to the gradation values of the base image data can be calculated from the blending ratio Blend.

The gain value Gain is a correction value (a coefficient) that is multiplied by the gradation values of the image data.

Note that the weighting applied to the gradation values of the base image data may be determined by the adjustment value processing unit 103 instead of the weighting applied to the gradation values of the HDR image data. Alternatively, both the weighting applied to the gradation values of the base image data and the weighting applied to the gradation values of the HDR image data may be determined.

Further, an addition value that is added to the gradation values of the mage data may be determined as the correction value instead of a coefficient that is multiplied by the gradation values of the image data.

The blending unit 104 generates combined image data (performs blending processing) by combining the gradation values of the HDR image data with the gradation values of the base image data in accordance with the blending ratio Blend output by the adjustment value processing unit 103. The blending unit 104 then outputs the combined image data.

The gain adjustment unit 105 generates the display-image data (performs gain adjustment processing) by correcting the gradation values of the combined image data output by the blending unit 104 using the correction value (the gain value Gain) output by the adjustment value processing unit 103. More specifically, the gain adjustment unit 105 generates the display-image data by multiplying the gain value Gain by the respective gradation values of the combined image data. The gain adjustment unit 105 then outputs the display-image data.

Note that the image processing performed to generate the display-image data is not limited to blending processing and gain adjustment processing. Other types of image processing, such as edge emphasis processing, airbrushing processing, interpolation pixel generation processing, IP (interlace progressive) conversion processing, and frame rate conversion processing, for example, may also be executed when generating the display-image data.

The display unit 106 displays an image based on the display-image data output by the gain adjustment unit 105 on a screen. A liquid crystal display panel, an organic EL display panel, a plasma display panel, or the like may be used as the display unit 106.

In this embodiment, the gradation values of the base image data, the gradation values of the HDR image data, and the gradation values of the display-image data will be referred to respectively as "BI", "HI", and "PI".

In this embodiment, an example of a case in which the display unit 106 has a following display capability will be described.

A lower limit value of a brightness of a display image (the image displayed on the screen) is 0.01 (cd/m$^2$)

An upper limit value of the brightness of the display image is 1000 (cd/m$^2$)

A maximum value of a contrast ratio of the display image is 100000:1

Note that the display capability of the display unit 106 may be higher or lower than the display capability described above.

In this embodiment, a maximum value of gradation values that can be taken by the base image data will be referred to as "BI_H" or "100% white". An example of a case in which the gradation value BI_H is 1.0 and a display brightness (a brightness on the screen) of 100% white is 100 (cd/m$^2$) will be described below. In this embodiment, the display brightness of 100% white will be referred to as a "standard brightness".

Further, in this embodiment, a minimum value of gradation values that can be taken by the base image data will be referred to as "BI_L" or "0.1% black". An example of a case in which the gradation value BI_L is 0.001 and the display brightness of 0.1% black is 0.1 (cd/m$^2$) will be described below.

Note that the gradation value BI_H may be larger or smaller than 1.0, and the display brightness of 100% white may be higher or lower than 100 (cd/m$^2$).

Further, the gradation value BI_L may be larger or smaller than 0.001, and the display brightness of 0.1% black may be higher or lower than 0.1 (cd/m$^2$).

A gradation value PI_H of the display-image data corresponding to the upper limit value of the display brightness can be calculated using Equation 1-1, shown below. A gradation value PI_L of the display-image data corresponding to the lower limit value of the display brightness can be calculated using Equation 1-2, shown below. In this embodiment, as described above, the gradation value BI_H is 1.0, the standard brightness is 100, the upper limit value of the display brightness is 1000, and the lower limit value of the display brightness is 0.01. In this embodiment, therefore, the gradation value PI_H is 10, and the gradation value PI_L is 0.0001.

PI_H=BI_H×upper limit value of display brightness/
standard brightness (Equation 1-1)

PI_L=BI_H×lower limit value of display brightness/
standard brightness (Equation 1-2)

In the decoding processing unit 102, HDR image data having respective gradation values of 0.0001≤HI≤10 are generated.

In this embodiment, a pixel having a larger gradation value than the gradation value PI=1.0 is displayed at a higher display brightness than the display brightness of a 100% white pixel (i.e. the standard brightness). In this embodiment, a region in which the gradation value PI is larger than 1.0, among regions of the display image, will be referred to as an "over-white region".

Furthermore, in this embodiment, a pixel having a smaller gradation value than the gradation value PI=0.001 is displayed at a lower display brightness than the display brightness of a 0.1% black pixel. In this embodiment, a region in which the gradation value PI is smaller than 0.001, among the regions of the display image, will be referred to as an "under-black region".

In this embodiment, processing for adjusting the dynamic range of the display image (the display-image data) will be referred to as "brightness range adjustment". In this embodiment, the dynamic range of the display image is adjusted in response to a user operation. Further, as described above, the brightness range value YR is used during the brightness range adjustment. In this embodiment, a value no smaller than 0 and no larger than 100 is used as the brightness range value. Furthermore, in this embodiment, 75 is used as an initial value of the brightness range value.

Note that the upper limit value, lower limit value, and initial value of the brightness range value may be smaller or larger than the above values (0, 100, and 75).

The adjustment value processing unit 103 determines the blending ratio Blend and the gain value Gain so that at least following Conditions 1 and 2 are satisfied.

Condition 1: When the brightness range value YR is a first value, identical display-image data to the HDR image data are generated.

Condition 2: When the brightness range value YR is smaller than the first value and equal to or larger than a second value, display-image data in which the dynamic range narrows steadily as the brightness range value YR decreases and a maximum gradation value of the dynamic range steadily approaches a maximum gradation value of the dynamic range of the base image data as the brightness range value YR decreases are generated.

In this embodiment, an example of a case in which the first value is 75 (the initial value) and the second value is 25 will be described.

In this embodiment, 0≤YR<25 will be referred to as "Section 1", 25≤YR≤75 will be referred to as "Section 2", and 75<YR≤100 will be referred to as "Section 3".

Note that the first value may be larger or smaller than 75. Further, the second value may be larger or smaller than 25. The initial value may be larger or smaller than the first value. The first value may be the upper limit value of the brightness range value YR, and the second value may be the lower limit value of the brightness range value YR.

The processing performed by the adjustment value processing unit 103, the blending unit 104, and the gain adjustment unit 105 will now be described in more detail.

Figure 2:
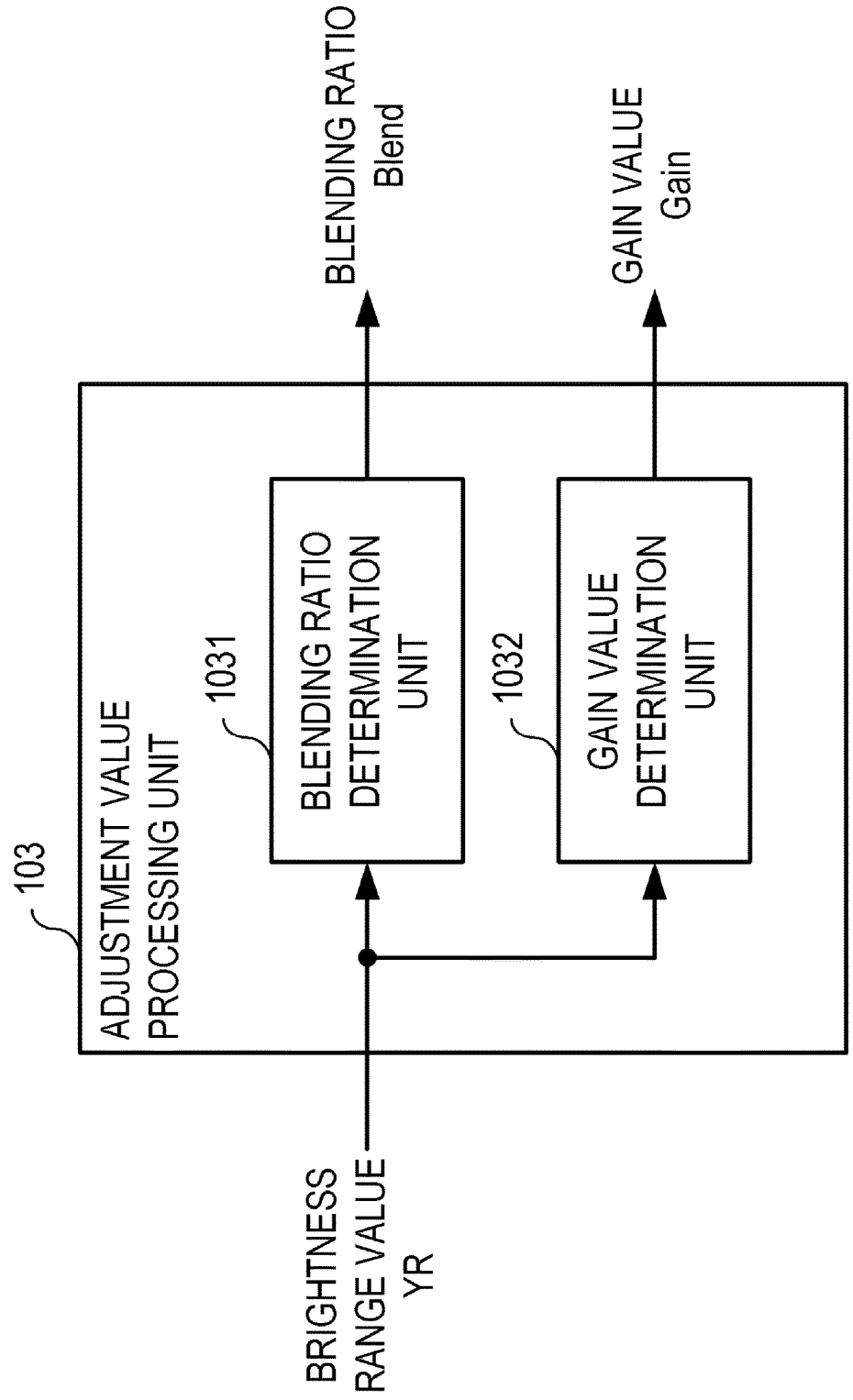
FIG. 2 is a view showing an example of a functional configuration of an adjustment value processing unit according to the first embodiment.

FIG. 2 is a block diagram showing an example of a functional configuration of the adjustment value processing unit 103.

As shown in FIG. 2, the adjustment value processing unit 103 includes a blending ratio determination unit 1031, a gain value determination unit 1032, and so on.

In this embodiment, blending characteristic information is recorded in advance in the storage unit, not shown in the drawings, in the form of a lookup table expressing a correspondence relationship between the brightness range value and the blending ratio.

The blending ratio determination unit 1031 reads the blending ratio Blend corresponding to the brightness range value YR from the blending characteristic information, and outputs the read blending ratio Blend.

Note that the blending characteristic information is not limited to a lookup table. For example, the blending characteristic information may be a function expressing the correspondence relationship between the brightness range value and the blending ratio. The blending ratio Blend may then be calculated from the brightness range value YR using the blending characteristic information.

Further, in this embodiment, gain characteristic information is recorded in advance in the storage unit, not shown in the drawings, in the form of a lookup table expressing a correspondence relationship between the brightness range value and the gain value.

The gain value determination unit 1032 reads the gain value Gain corresponding to the brightness range value YR from the gain characteristic information, and outputs the read gain value Gain.

Note that the gain characteristic information is not limited to a lookup table. For example, the gain characteristic information may be a function expressing the correspondence relationship between the brightness range value and the gain value. The gain value Gain may then be calculated from the brightness range value YR using the gain characteristic information.

The blending unit 104 generates the combined image data by combining the gradation values of the HDR image data with the gradation values of the base image data in accordance with the blending ratio Blend output by the blending ratio determination unit 1031. More specifically, the combined image data are generated by performing processing to calculate a gradation value MI of the combined image data for each pixel using Equation 2, shown below.

$$MI=(Blend/100) \times HI+(1-Blend/100) \times BI \quad \text{(Equation 2)}$$

The gain adjustment unit 105 generates the display-image data by correcting the gradation values of the combined image data output by the blending unit 104 using the gain value Gain output by the gain value determination unit 1032. More specifically, the display-image data are generated by performing processing to calculate the gradation value PI of the display-image data for each pixel using Equation 3, shown below. Note that when the gradation value PI obtained from Equation 3 is a value outside the range of the gradation values that can be displayed by the display unit 106, the limiting processing is performed, as described above.

$$PI=Gain \times MI \quad \text{(Equation 3)}$$

Figure 3:
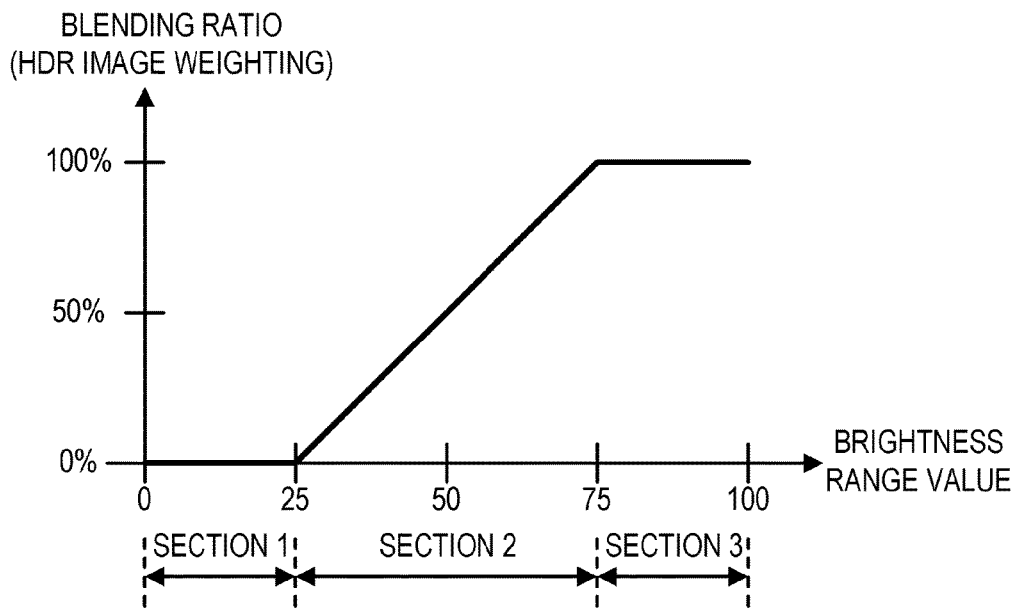
FIG. 3 is a view showing an example of blending characteristic information according to the first embodiment.

FIG. 3 is a view showing an example of the blending characteristic information (the correspondence relationship between the brightness range value and the blending ratio).

Figure 4:
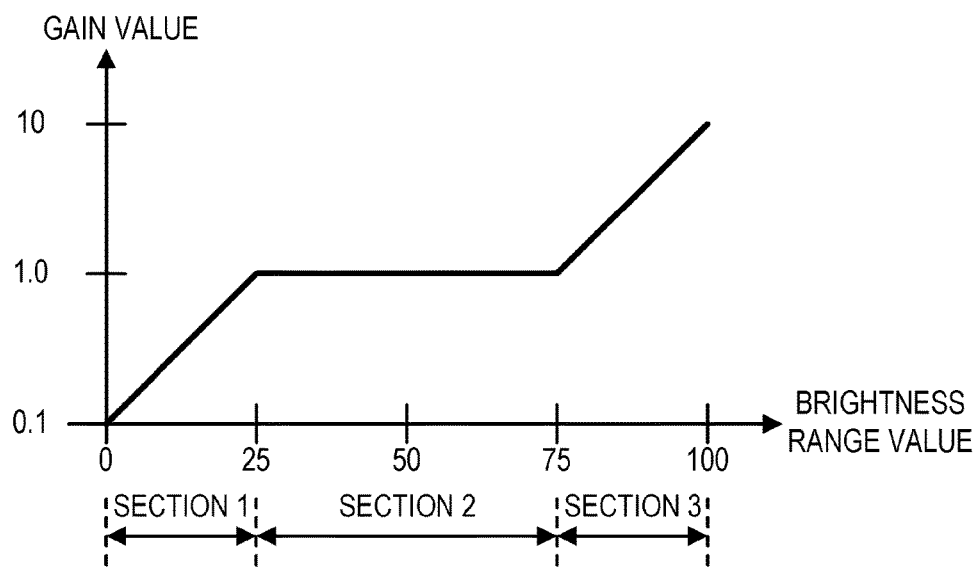
FIG. 4 is a view showing an example of gain characteristic information according to the first embodiment.

FIG. 4 is a view showing an example of the gain characteristic information (the correspondence relationship between the brightness range value and the gain value).

In this embodiment, an example of a case in which the blending characteristic information and the gain characteristic information shown respectively in FIGS. 3 and 4 are used will be described.

In the blending characteristic information shown in FIG. 3, 0 (a fixed value) is set as the blending ratio in Section 1. In the gain characteristic information shown in FIG. 4, a gain value that increases linearly from 0.1 to 1.0 as the brightness range value increases is set as the gain value in Section 1.

Therefore, when the brightness range value YR is a value in Section 1 (a smaller value than the second value (25)), display-image data in which the maximum gradation value of the dynamic range decreases steadily as the brightness range value YR decreases are generated. More specifically, when the brightness range value YR is a value in Section 1, 0 is used as the blending ratio Blend. As a result, identical combined image data to the base image data are generated. Further, when the brightness range value YR is a value in Section 1, a gain value that increases as the brightness range value YR increases and is smaller than 1.0 is used as the gain value Gain. As a result, display-image data having steadily smaller gradation values as the brightness range value YR decreases are generated. In other words, steadily darker display-image data are generated as the brightness range value YR decreases. Furthermore, in this embodiment, when the brightness range value YR is the lower limit value, 0.1 is used as the gain value Gain. As a result, display-image data having gradation values that are 0.1 times the gradation values of the base image data are generated.

Note that the lower limit value of the gain value may be larger or smaller than 0.1.

Further, in the blending characteristic information shown in FIG. 3, a blending ratio that increases linearly from 0 to 100 as the brightness range value increases is set as the blending ratio in Section 2. In the gain characteristic information shown in FIG. 4, 1.0 (a fixed value) is set as the gain value in Section 2.

Therefore, when the brightness range value YR is a value in Section 2 (a value equal to or larger than the second value and equal to or smaller than the first value), 1.0 is used as the gain value Gain. When 1.0 is used as the gain value Gain, identical display-image data to the combined image data are generated. Hence, when the brightness range value YR is a value in Section 2, the display-image data are generated by combining the gradation values of the base image data with the gradation values of the HDR image data at a weighting that corresponds to the brightness range value YR.

When the brightness range value YR is a value in Section 2, a blending ratio that increases from 0 to 100 as the brightness range value YR increases is used as the blending ratio Blend. As a result, display-image data (=combined image data) that steadily approach the HDR image data as the brightness range value YR increases are generated. Further, display-image data that steadily approach the base image data as the brightness range value YR decreases are generated. More specifically, when the brightness range value YR is the first value (75), 100 is used as the blending ratio Blend. As a result, identical display-image data to the HDR image data are generated, whereby Condition 1 is satisfied. When the brightness range value YR is the second value (25), 0 is used as the blending ratio Blend. As a result, identical display-image data to the base image data are generated. When the brightness range value YR is larger than the second value and smaller than the first value, a blending ratio that increases continuously as the brightness range value YR increases is used as the blending ratio Blend. As a result, the gradation values of the display-image data change continuously from the gradation values of the base image data to the gradation values of the HDR image data as the brightness range value YR increases. In other words, the dynamic range of the display-image data changes continuously from the dynamic range of the base image data to the dynamic range of the HDR image data as the brightness range value YR increases. As a result, Condition 2 is satisfied.

Furthermore, in the blending characteristic information shown in FIG. 3, 100 (a fixed value) is set as the blending ratio in Section 3. In the gain characteristic information shown in FIG. 4, a gain value that increases linearly from 1.0 to 10 as the brightness range value increases is set as the gain value in Section 3.

Therefore, when the brightness range value YR is a value in Section 3 (a larger value than the first value (75)), display-image data in which the maximum gradation value of the dynamic range increases steadily as the brightness range value YR increases are generated. More specifically, when the brightness range value YR is a value in Section 3, 100 is used as the blending ratio Blend. As a result, identical combined image data to the HDR image data are generated. Further, when the brightness range value YR is a value in Section 3, a gain value that increases as the brightness range value YR increases and is larger than 1.0 is used as the gain value Gain. As a result, display-image data having steadily larger gradation values as the brightness range value YR increases are generated. In other words, steadily brighter display-image data are generated as the brightness range value YR increases. Furthermore, in this embodiment, when the brightness range value YR is the upper limit value, 10 is used as the gain value Gain. As a result, display-image data having gradation values that are 10 times the gradation values of the HDR image data are generated.

Note that the upper limit value of the gain value may be larger or smaller than 10.

In the blending characteristic information shown in FIG. 3, the blending ratio is set to change continuously in accordance with continuous change in the brightness range value. Further, in the gain characteristic information shown in FIG. 4, the gain value is set to change continuously in accordance with continuous change in the brightness range value.

Therefore, when the brightness range value YR changes continuously, the brightness, the gradation values, and the dynamic range of the display-image data change continuously.

Using FIGS. 5A to 5G, the display-image data and the dynamic range thereof according to this embodiment will be described in more detail.

FIGS. 5A to 5G are views showing examples of image data and dynamic ranges (brightness ranges) thereof according to this embodiment. In FIGS. 5A to 5G, numerals depicted on the image data (images represented by the image data) indicate gradation values of respective regions in which the numerals are depicted.

FIGS. 5A to 5G show examples of a case in which the information of FIGS. 3 and 4 is used.

Figure 5A:
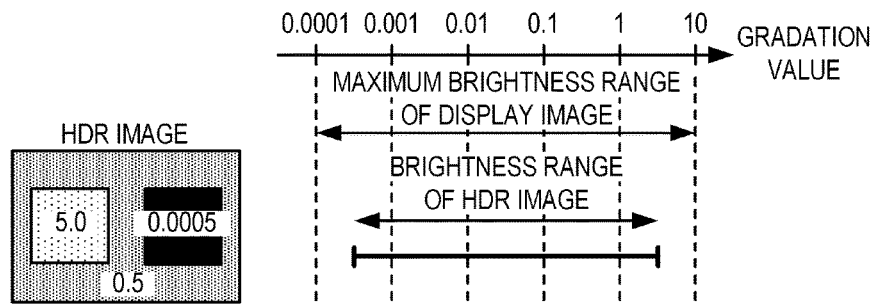
FIGS. 5A to 5G are views showing examples of image data and dynamic ranges thereof according to the first embodiment.

FIG. 5A shows the HDR image data and the dynamic range thereof.

Figure 5B:
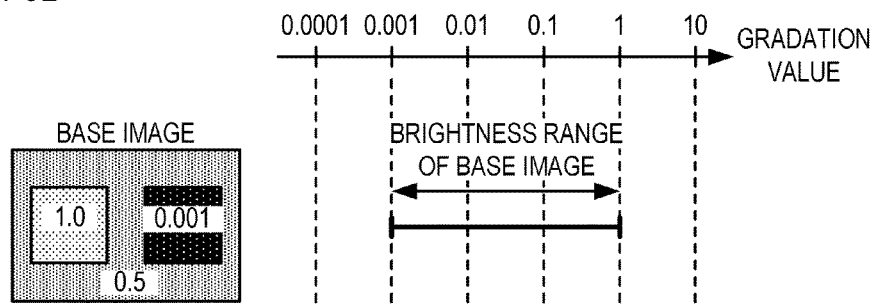

FIG. 5B shows the base image data and the dynamic range thereof.

Figure 5C:
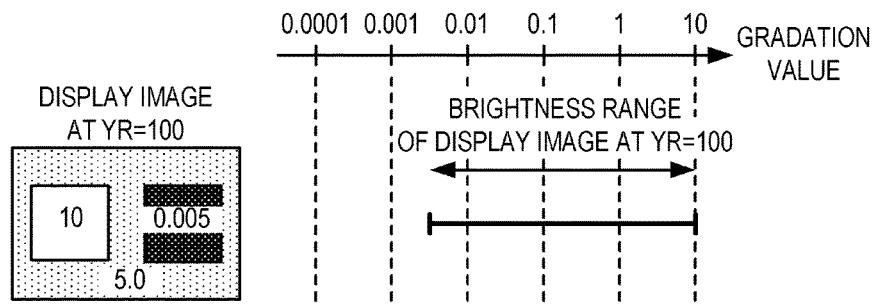

FIG. 5C shows the display-image data when the brightness range value YR=100 and the dynamic range thereof.

Figure 5D:
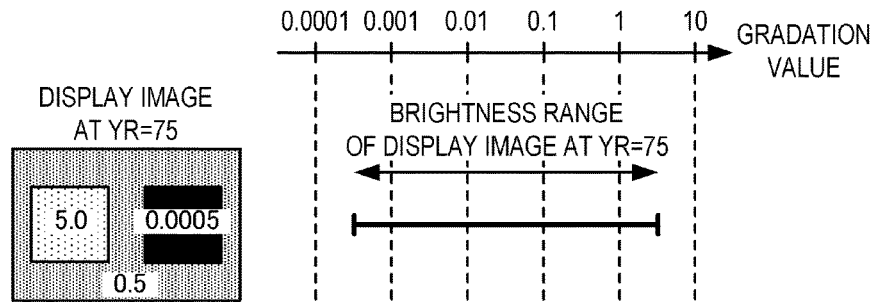

FIG. 5D shows the display-image data when the brightness range value YR=75 and the dynamic range thereof.

Figure 5E:
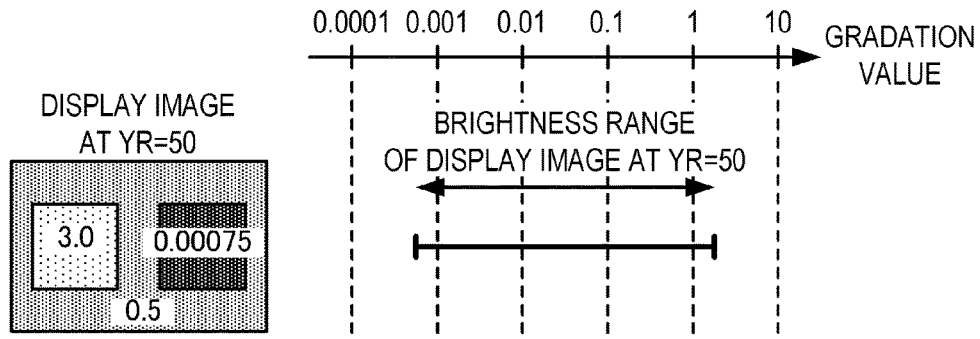

FIG. 5E shows the display-image data when the brightness range value YR=50 and the dynamic range thereof.

Figure 5F:
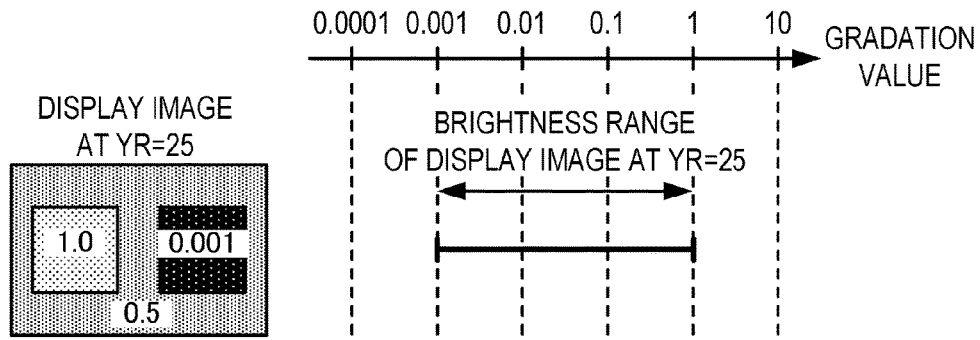

FIG. 5F shows the display-image data when the brightness range value YR=25 and the dynamic range thereof.

Figure 5G:
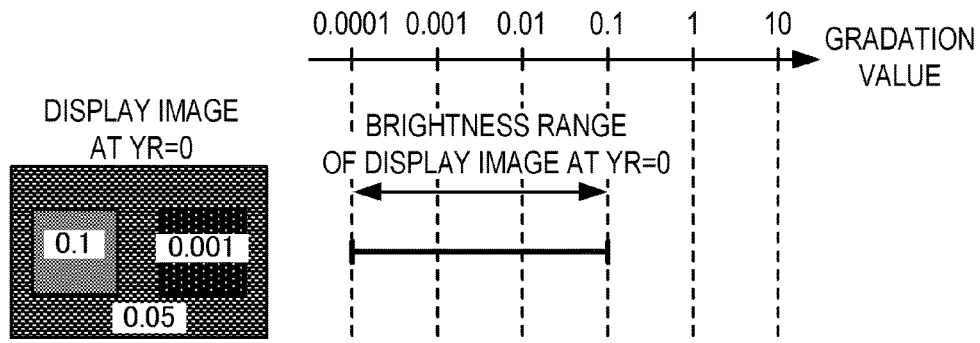

FIG. 5G shows the display-image data when the brightness range value YR=0 and the dynamic range thereof.

It can be seen from FIGS. 5A to 5G that the upper limit value of the gradation values of the display-image data is 10 and the lower limit value of the gradation values of the display-image data is 0.0001. In other words, it can be seen that a maximum dynamic range (a maximum brightness range) of the display-image data is a dynamic range having gradation values between 0.0001 and 10. The maximum dynamic range is a maximum range of the dynamic ranges that can be taken by the image data.

It can be seen from FIG. 5A that the HDR image data have a dynamic range with a minimum gradation value of 0.0005 and a maximum gradation value of 5.0. In other words, it can be seen that the gradation values of the HDR image data are no smaller than 0.0005 and no larger than 0.5.

It can be seen from FIG. 5B that the base image data have a dynamic range with a minimum gradation value of 0.001 and a maximum gradation value of 1.0.

When the brightness range value YR is a value in Section 1, the dynamic range of the display-image data changes continuously from the dynamic range shown in FIG. 5F to the dynamic range shown in FIG. 5G as the brightness range value YR decreases. More specifically, display-image data having a dynamic range that is obtained by shifting the dynamic range of the base image data to a low gradation side by a steadily larger shift amount as the brightness range value YR decreases are generated. As a result, the brightness of the display-image data decreases continuously as the brightness range value YR decreases.

When the brightness range value YR is a value in Section 2, the dynamic range of the display-image data changes continuously from the dynamic range shown in FIG. 5D to the dynamic range shown in FIG. 5F as the brightness range value YR decreases. The dynamic range shown in FIG. 5D is equal to the dynamic range of the HDR image data, and the dynamic range shown in FIG. 5F is equal to the dynamic range of the base image data. When the brightness range value YR is larger than 25 and smaller than 75, as shown in FIG. 5E, display-image data having a dynamic range that is narrower than the dynamic range of the HDR image data and wider than the dynamic range of the base image data are generated. More specifically, when the brightness range value YR is larger than 25 and smaller than 75, display-image data having a dynamic range that satisfies following Conditions 3 and 4 are generated.

Condition 3: The maximum gradation value is smaller than the maximum gradation value of the dynamic range of the HDR image data and larger than the maximum gradation value of the dynamic range of the base image data.

Condition 4: The minimum gradation value is larger than the minimum gradation value of the dynamic range of the HDR image data and smaller than the minimum gradation value of the dynamic range of the base image data.

In other words, when the brightness range value YR is a value in Section 2, the maximum gradation value of the dynamic range of the display-image data decreases continuously from the gradation value of the over-white region to the gradation value of 100% white as the brightness range value YR decreases. Further, the minimum gradation value of the dynamic range of the display-image data increases continuously from a gradation value of the under-black region to the gradation value of 0.1% black as the brightness range value YR decreases.

When the brightness range value YR is a value in Section 3, the dynamic range of the display-image data changes continuously from the dynamic range shown in FIG. 5D to the dynamic range shown in FIG. 5C as the brightness range value YR increases. More specifically, display-image data having a dynamic range that is obtained by shifting the dynamic range of the HDR image data to a high gradation side by a steadily larger shift amount as the brightness range value YR increases are generated. As a result, the brightness of the display-image data increases continuously as the brightness range value YR increases. In FIG. 5C, the maximum gradation value of the dynamic range is limited to the upper limit value.

According to this embodiment, as described above, the display-image data are generated from the base image data and the HDR image data using a blending ratio and a gain value corresponding to the brightness range value. More specifically, the display-image data are generated so as to satisfy Conditions 1 and 2, described above. As a result, the dynamic range of the display-image data can be adjusted favorably. More specifically, display-image data that are identical to the HDR image data and display-image data that are identical to the base image data can both be obtained. Moreover, the dynamic range of the display-image data can be modified continuously in a case where the brightness range value changes continuously.

Figure 23A:
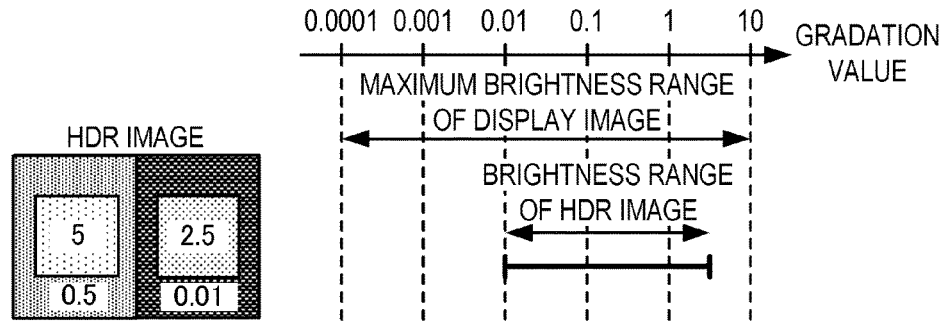
Figure 23B:
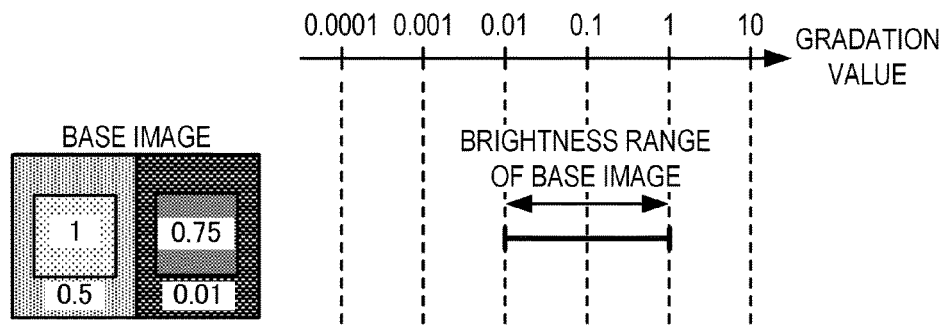
Figure 23C:
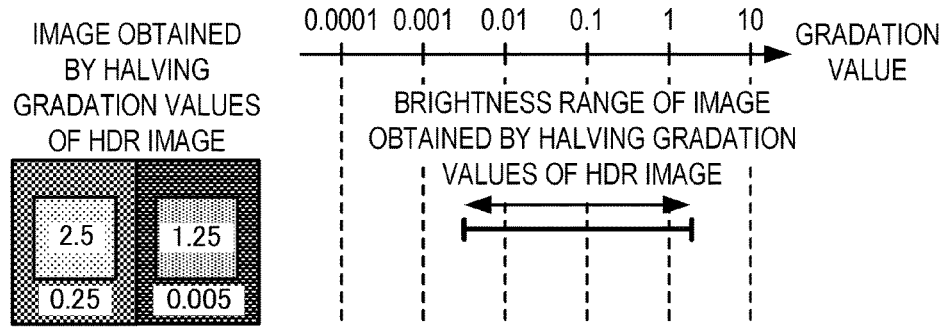

Effects of this embodiment will be described in further detail below using FIGS. 23A to 23E. FIG. 23A shows the HDR image data and the dynamic range thereof. FIG. 23B shows the base image data and the dynamic range thereof. FIG. 23C shows image data generated by multiplying a gain value of 0.5 by the respective gradation values of the HDR image data shown in FIG. 23A, and a dynamic range thereof. FIG. 23D shows image data obtained by clipping (limiting) gradation values that are larger than 2.5, among the gradation values of the HDR image data shown in FIG. 23A, to 2.5, and a dynamic range thereof. FIG. 23E shows image data generated using the methods described in this embodiment, and a dynamic range thereof. More specifically, FIG. 23E shows image data generated from the HDR image data of FIG. 23A and the base image data of FIG. 23B using 50 as the blending ratio Blend and 1 as the gain value Gain, and a dynamic range thereof. In other words, the image data shown in FIGS. 23C, 23D, and 23E are image data obtained by approximately halving the brightness of a high brightness portion of the HDR image data shown in FIG. 23A using respectively different methods.

When a method of simply multiplying 0.5 by the respective gradation values of the HDR image data is employed, the brightness in regions other than high brightness regions (regions in which the gradation value of the HDR image data is 5 or 2.5) is converted to a much smaller value than that of the base image data. As shown in FIG. 23C, for example, a gradation value 0.5 of the HDR image data is converted to a gradation value 0.25, which is smaller than a gradation value 0.5 of the base image data. As a result, image data in which an overall impression of the image differs greatly from the base image data are obtained.

When a method of simply clipping gradation values larger than 2.5, among the gradation values of the HDR image data, to 2.5 is employed, a contrast in the high brightness regions decreases greatly. As shown in FIG. 23D, for example, a gradation value 5.0 of the HDR image a data and a gradation value 2.5 of the HDR image data are both converted to a gradation value 2.5, leading to a large reduction in the contrast of the high brightness regions. As a result, image data in which the overall impression of the image differs greatly from the base image data are obtained.

With the method according to this embodiment, on the other hand, image data are generated in consideration of the features of the base image data. More specifically, with the method according to this embodiment, the gradation values of the HDR image data and the gradation values of the base image data are combined using the blending ratio Blend, whereupon the gain value Gain is multiplied by the combined gradation values. As a result, as shown in FIG. 23E, a reduction in contrast in the high brightness regions can be suppressed, and image data in which the overall impression of the image is close to the base image data are obtained.

According to this embodiment, as described above, in comparison with simple methods such as performing only the gain adjustment processing or performing only the limiting processing, image data in which the contrast in the high brightness regions is high and the overall impression of the image is close to the base image data can be obtained.

Note that the image data according to this embodiment may be static image data or moving image data. In a case where moving image data are processed, the base image data and the brightness difference data may be obtained in each frame of the moving image data. The brightness difference data may also be obtained in each scene of the moving image data. The decoding processing unit 102 may then generate the HDR image data in each frame from the base image data and the brightness difference data. When the brightness difference data are obtained in each frame, the brightness difference data used to generate the HDR image data may be switched for each frame. When the brightness difference data are obtained in each scene, the brightness difference data used to generate the HDR image data may be switched for each scene.

As described above, there are no particular limitations on the display capability of the display unit 106. For example, the display unit 106 may have a following display capability.

The lower limit value of the brightness of the display image is 0.01 ($cd/m^2$)

The upper limit value of the brightness of the display image is 500 ($cd/m^2$)

The maximum value of the contrast ratio of the display image is 50000:1

In this case, the gradation value PI_H is 10 and the gradation value PI_L is 0.0001.

Note that the correspondence relationship between the brightness range value and the blending ratio and the correspondence relationship between the brightness range value and the gain value are not limited to the correspondence relationships shown in FIGS. 3 and 4, and as long as Conditions 1 and 2 are satisfied, any correspondence relationships may be used. For example, in Sections 1 and 3, the gain value may change exponentially in accordance with change in the brightness range value, and in Section 2, the blending ratio may change exponentially in accordance with change in the brightness range value.

Furthermore, in the examples of FIGS. 3 and 4, when one of the blending ratio and the gain value changes in accordance with change in the brightness range value, the other is kept constant. In other words, the blending ratio and the gain value change exclusively in accordance with change in the brightness range value. As long as Conditions 1 and 2 are satisfied, however, a section in which both the blending ratio and the gain value change in accordance with change in the brightness range value may be provided. For example, the blending ratio and the gain value may both change in accordance with change in the brightness range value in at least one of Section 1, Section 2, and Section 3.

As described above, the brightness difference data are not limited to an inverse tone map. For example, brightness ratio data may be obtained as the brightness difference data and used to generate the HDR image data. An inverse tone map may then be generated from the brightness ratio data and used to generate the HDR image data. Alternatively, the HDR image data may be generated from the brightness ratio data without generating an inverse tone map.

Note that in this embodiment, an example in which the brightness range value is obtained in accordance with a user operation was described, but the present invention is not limited thereto, and instead, for example, the brightness range value may be determined in accordance with an operating mode of the image processing apparatus or the image display apparatus. More specifically, one of a plurality of operating modes including a high power mode, a medium power mode, and a low power mode may be set. The high power mode is an operating mode in which a power consumption of the image display apparatus is high. The medium power mode is an operating mode in which the power consumption is lower than in the high power mode. The low power mode is an operating mode in which the power consumption is lower than in the medium power mode. When the high power mode is set, the brightness range value YR is set at 75. When the medium power mode is set, the brightness range value YR is set at 50. When the low power mode is set, the brightness range value YR is set at 25.

(Second Embodiment)

An image processing apparatus and an image processing method according to a second embodiment of the present invention will now be described.

In the first embodiment, the display-image data are generated in Section 2 by combining the gradation values of the base image data with the gradation values of the HDR image data. In the first embodiment, therefore, gradation values on the low gradation side increase steadily as the weighting applied to the base image data increases (i.e. as the brightness range value YR decreases). In other words, the display brightness of an image region having a gradation value on the low gradation side (i.e. a low gradation region) increases as the brightness range value YR decreases.

Hence, in this embodiment, a configuration enabling generation of display-image data in which the minimum gradation value of the dynamic range is identical to the minimum gradation value of the dynamic range of the HDR image data in Section 2, regardless of the brightness range value YR, will be described. More specifically, a configuration with which the display-image data can be generated in Section 2 such that the minimum gradation value of the display-image data does not increase as the brightness range value YR decreases but the maximum gradation value of the display-image data decreases as the brightness range value YR decreases will be described. According to this configuration, an increase in the display brightness in the low gradation region accompanying a reduction in the brightness range value YR can be suppressed.

Configurations and processing that differ from the first embodiment will be described in detail below, but description of similar configurations and processing to the first embodiment will be omitted.

The image processing apparatus according to this embodiment is configured similarly to the first embodiment (FIG. 1). In this embodiment, however, the processing performed by the adjustment value processing unit 103 differs from the first embodiment.

FIG. 6 is a block diagram showing an example of a functional configuration of the adjustment value processing unit 103 according to this embodiment.

As shown in FIG. 6, the adjustment value processing unit 103 according to this embodiment includes a first blending ratio determination unit 2011, a second blending ratio determination unit 2012, a blending ratio combining unit 2013, and a gain value determination unit 2014.

The blending ratio Blend is determined by the first blending ratio determination unit 2011, the second blending ratio determination unit 2012, and the blending ratio combining unit 2013. In this embodiment, the blending ratio Blend is determined for each pixel in accordance with a combination of the brightness range value YR and the gradation value of the HDR image data. The blending unit 104 then generates the combined image data by performing processing to combine the gradation value of the base image data with the gradation value of the HDR image data on each pixel using the blending ratio Blend.

In this embodiment, first blending characteristic information is recorded in advance in the storage unit, not shown in the drawings, in the form of a lookup table expressing a correspondence relationship between the brightness range value and the first blending ratio.

The first blending ratio determination unit 2011 reads a first blending ratio Blend_1 corresponding to the brightness range value YR from the first blending characteristic information, and outputs the read first blending ratio Blend_1.

Note that the first blending characteristic information is not limited to a lookup table. For example, the first blending characteristic information may be a function expressing the correspondence relationship between the brightness range value and the first blending ratio. The first blending ratio Blend_1 may then be calculated from the brightness range value YR using the first blending characteristic information.

In this embodiment, second blending characteristic information is recorded in advance in the storage unit, not shown in the drawings, in the form of a lookup table expressing a correspondence relationship between the gradation values that can be taken by the HDR image data and the second blending ratio.

The second blending ratio determination unit 2012 reads a second blending ratio Blend_2 corresponding to the gradation value HI of the HDR image data from the second blending characteristic information, and performs processing on each pixel to output the read second blending ratio Blend_2.

Note that the second blending characteristic information is not limited to a lookup table. For example, the second blending characteristic information may be a function expressing the correspondence relationship between the gradation value and the second blending ratio. The second blending ratio Blend_2 may then be calculated from the gradation value HI using the second blending characteristic information.

The blending ratio combining unit 2013 determines the blending ratio Blend by combining the first blending ratio Blend_1 output by the first blending ratio determination unit 2011 with the second blending ratio Blend_2 output by the second blending ratio determination unit 2012. In this embodiment, the blending ratio Blend is calculated by adding the second blending ratio Blend_2 to the first blending ratio Blend_1. When a combined blending ratio obtained by adding the second blending ratio Blend_2 to the first blending ratio Blend_1 is larger than 100, the blending ratio Blend is determined by limiting the combined blending ratio that is larger than 100 to 100. Accordingly, a value no smaller than 0 and no larger than 100 is obtained as the blending ratio Blend. The blending ratio combining unit 2013 then outputs the determined blending ratio Blend.

The blending ratio combining unit 2013 performs the processing for determining and outputting the blending ratio Blend on each pixel.

Note that the blending ratio combining method is not limited to the method described above. For example, a value that is multiplied by the first blending ratio Blend_1 may be obtained as the second blending ratio Blend_2. The blending ratio Blend may then be calculated by multiplying the second blending ratio Blend_2 by the first blending ratio Blend_1.

The gain value determination unit 2014 performs identical processing to the gain value determination unit 1032 according to the first embodiment.

Figure 7:
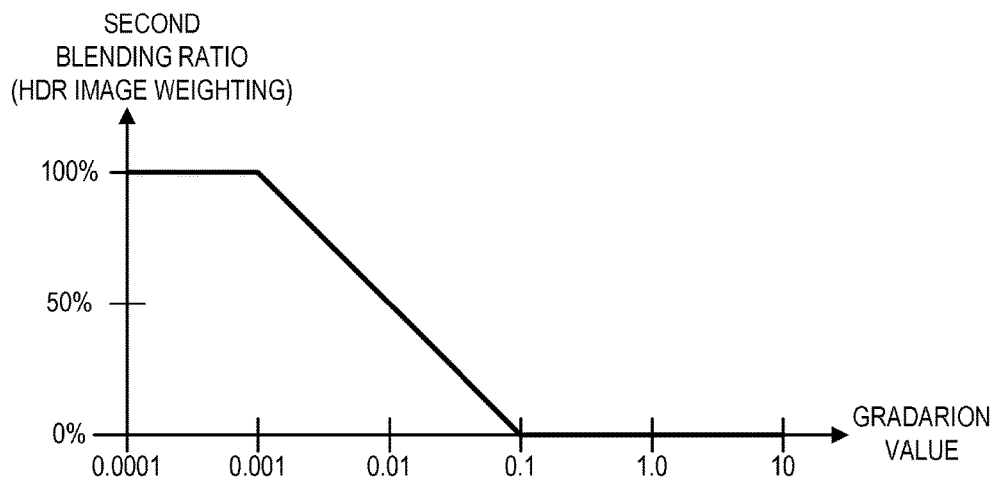
FIG. 7 is a view showing an example of second blending characteristic information according to the second embodiment.

FIG. 7 is a view showing an example of the second blending characteristic information (the correspondence relationship between the gradation value and the second blending ratio).

In this embodiment, an example of a case in which the blending characteristic information according to the first embodiment (FIG. 3) is used as the first blending characteristic information and the gain characteristic information according to the first embodiment (FIG. 4) is used as the gain characteristic information will be described. Further, in this embodiment, an example of a case in which the second blending characteristic information shown in FIG. 7 is used will be described.

In the second blending characteristic information, the second blending ratio is set such that identical gradation values to the gradation values of the HDR image data are obtained as the gradation values of the combined image data obtained when the minimum gradation value of the dynamic range of the base image data does not exceed 0.001. In the example of FIG. 7, 100% (a fixed value) is set as the second blending ratio in a gradation range in which the gradation value HI of the HDR image data does not exceed 0.001. In a gradation range in which the gradation value HI is no smaller than 0.001 and no larger than 0.1, the second blending ratio is set to decrease linearly from 100% to 0% as the gradation value increases. 0% (a fixed value) is set as the second blending ratio in a gradation range in which the gradation value HI equals or exceeds 0.001.

Figure 8:
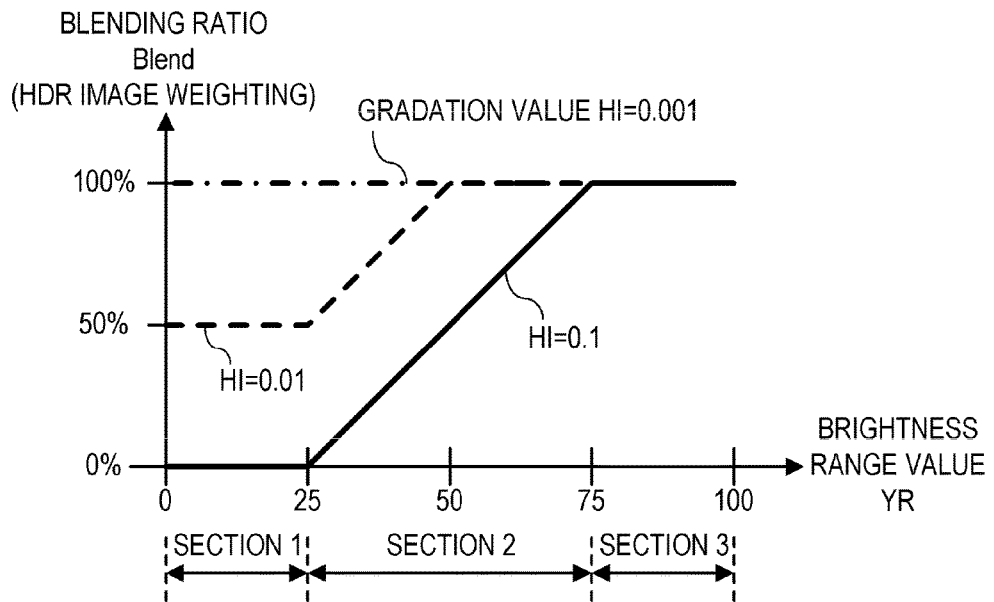
FIG. 8 is a view showing an example of a correspondence relationship between a brightness range value and a blending ratio according to the second embodiment.

FIG. 8 shows an example of the correspondence relationship between the brightness range value YR and the blending ratio Blend in a case where the first blending characteristic information shown in FIG. 3 and the second blending characteristic information shown in FIG. 7 are used. FIG. 8 shows the correspondence relationship with respect to three gradation values HI, namely 0.001, 0.01, and 0.1.

100% is obtained as the second blending ratio in relation to a pixel in which the gradation value HI of the HDR image data is 0.001. As shown by a dot-dash line in FIG. 8, 100% is obtained as the blending ratio Blend in relation to a pixel in which the gradation value HI is 0.001 at all times, regardless of the brightness range value YR.

50% is obtained as the second blending ratio in relation to a pixel in which the gradation value HI is 0.01. Therefore, as shown by a dotted line in FIG. 8, when the brightness range value YR is a value in Section 1, 50% is obtained as the blending ratio Blend in relation to a pixel in which the gradation value HI is 0.01.

0% is obtained as the second blending ratio in relation to a pixel in which the gradation value HI is 0.1. Therefore, as shown by a solid line in FIG. 8, an identical blending ratio Blend to the first embodiment is obtained in relation to a pixel in which the gradation value HI is 0.1.

Hence, an identical value to the gradation value HI is set as the gradation value of the combined image data in relation to pixels in which the gradation value HI of the HDR image data is equal to or smaller than 0.001, regardless of the brightness range value. As regards pixels in which 0.001<the gradation value HI<0.1, when the brightness range value YR is small, a smaller (darker) gradation value than the first embodiment is set as the gradation value of the combined image data. Further, with respect to pixels in which the gradation value HI equals or exceeds 0.1, an identical gradation value to the first embodiment is set as the gradation value of the combined image data.

Processing performed respectively in Sections 1 to 3 of the brightness range value will now be described.

When the brightness range value YR is a value in Section 1 (a smaller value than the second value (25)), display-image data in which the maximum gradation value of the dynamic range decreases steadily as the brightness range value YR decreases are generated.

More specifically, as shown in FIG. 8, when the brightness range value YR is a value in Section 1, a steadily larger blending ratio Blend is used as the gradation values of the pixels of the HDR image data decrease. As a result, the combined image data are generated so as to satisfy Conditions 5 and 6, described below.

Condition 5: Synthesized image data in which the gradation values of the pixels steadily approach the gradation values of the pixels of the HDR image data as the gradation values of the pixels of the HDR image data decrease are generated.

Condition 6: Synthesized image data in which the gradation values of the pixels steadily approach the gradation values of the pixels of the base image data as the gradation values of the pixels of the HDR image data increase are generated.

Similarly to the first embodiment, when the brightness range value YR is a value in Section 1, a gain value that increases as the brightness range value YR increases and is smaller than 1.0 is used as the gain value Gain. As a result, display-image data having steadily smaller gradation values as the brightness range value YR decreases are generated.

When the brightness range value YR is a value in Section 2 (a value equal to or larger than the second value and equal to or smaller than the first value), 1.0 is used as the gain value Gain, similarly to the first embodiment. Hence, when the brightness range value YR is a value in Section 2, identical display-image data to the combined image data are generated. In other words, the display-image data are generated by performing processing for combining the gradation value of the base image data with the gradation value of the HDR image data on each pixel using a weighting that corresponds to the combination of the brightness range value YR and the gradation value of the HDR image data.

When the brightness range value YR is the first value (75), 100 is used as the blending ratio Blend, regardless of the gradation value HI of the HDR image data. As a result, identical display-image data (=combined image data) to the HDR image data are generated, whereby Condition 1 is satisfied.

When the brightness range value YR is smaller than the first value and equal to or larger than the second value, a blending ratio that increases continuously to 100% as the brightness range value YR increases and increases continuously to 100% as the gradation value HI decreases is used as the blending ratio Blend. Further, 0% is used as the blending ratio Blend corresponding to a combination of the minimum value of the gradation values that can be taken by the HDR image data and the lower limit value of the brightness range value YR. As a result, the display-image data (=the combined image data) are generated so as to satisfy Condition 2 of the first embodiment and Conditions 7 and 8 described below. By satisfying Conditions 2, 7, and 8, Condition 1 of the first embodiment is also satisfied.

Condition 7: Display-image data in which the gradation values of the pixels steadily approach the gradation values of the pixels of the HDR image data as the gradation values of the pixels of the HDR image data decrease are generated.

Condition 8: Display-image data that steadily approach the HDR image data as the brightness range value YR increases are generated.

When the brightness range value YR is a value in Section 3 (a larger value than the first value (75)), display-image data in which the maximum gradation value of the dynamic range increases as the brightness range value YR increases are generated.

More specifically, when the brightness range value YR is a value in Section 3, 100 is used as the blending ratio Blend regardless of the gradation value HI of the HDR image data, similarly to the first embodiment. As a result, identical combined image data to the HDR image data are generated.

When the brightness range value YR is a value in Section 3, a gain value that increases as the brightness range value YR increases and is larger than 1.0 is used as the gain value Gain. As a result, display-image data having steadily larger gradation values as the brightness range value YR increases are generated.

Using FIGS. 9A to 9G, the display-image data and the dynamic range thereof according to this embodiment will be described in more detail.

FIGS. 9A to 9G are views showing examples of image data and dynamic ranges (brightness ranges) thereof according to this embodiment. In FIGS. 9A to 9G, numerals depicted on the image data (the images represented by the image data) indicate the gradation values of the regions in which the numerals are depicted.

FIGS. 9A to 9G show examples of a case in which the information of FIGS. 3, 4, and 7 is used.

Figure 9A:
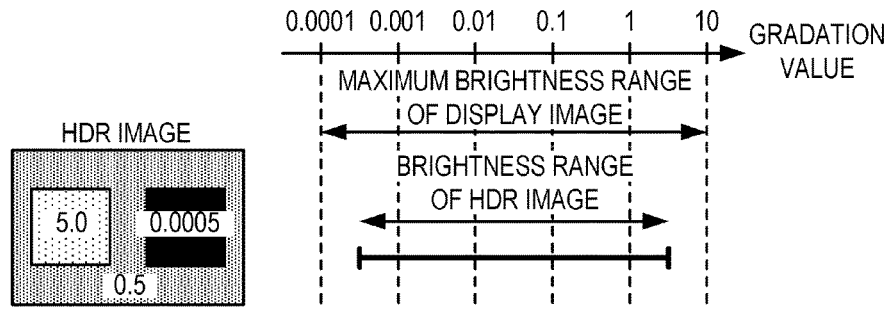
FIGS. 9A to 9G are views showing examples of image data and dynamic ranges thereof according to the second embodiment.

FIG. 9A shows the HDR image data and the dynamic range thereof.

Figure 9B:
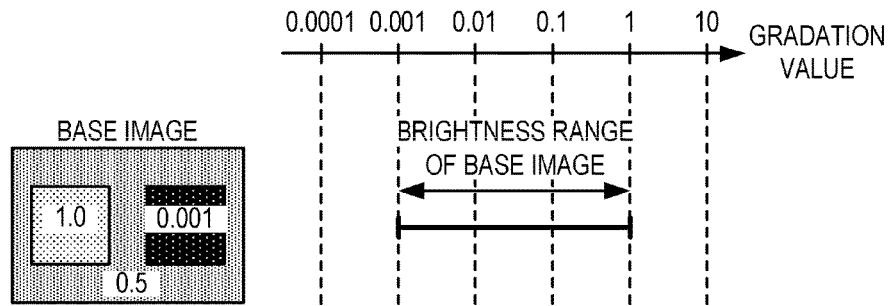

FIG. 9B shows the base image data and the dynamic range thereof.

Figure 9C:
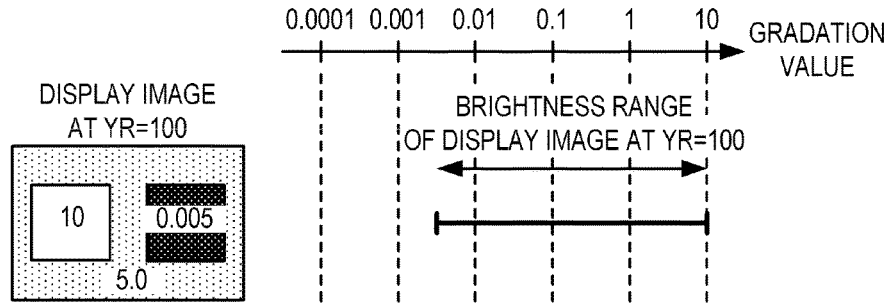

FIG. 9C shows the display-image data when the brightness range value YR=100 and the dynamic range thereof.

Figure 9D:
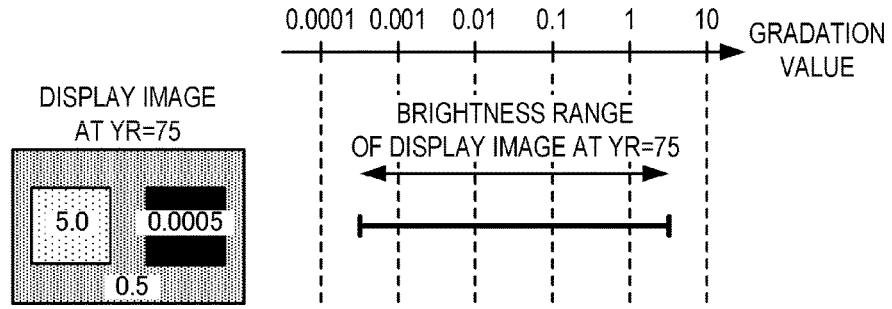

FIG. 9D shows the display-image data when the brightness range value YR=75 and the dynamic range thereof.

Figure 9E:
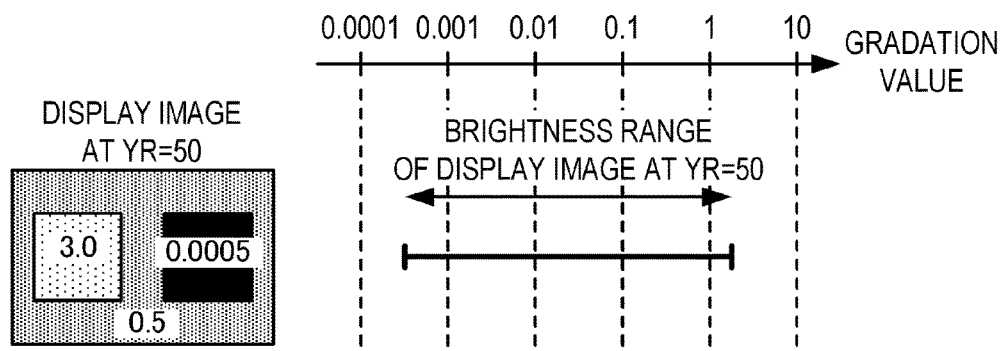

FIG. 9E shows the display-image data when the brightness range value YR=50 and the dynamic range thereof.

Figure 9F:
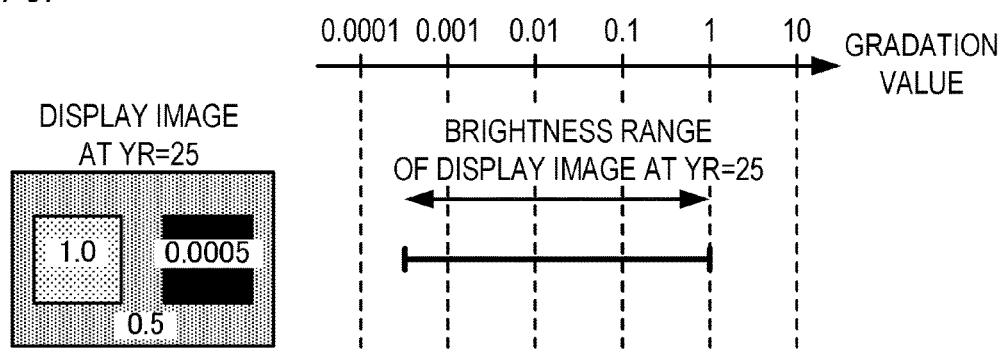

FIG. 9F shows the display-image data when the brightness range value YR=25 and the dynamic range thereof.

Figure 9G:
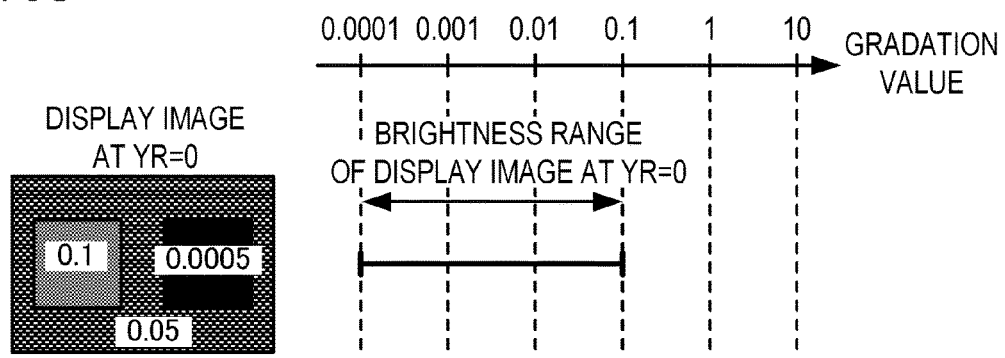

FIG. 9G shows the display-image data when the brightness range value YR=0 and the dynamic range thereof.

It can be seen from FIGS. 9A to 9G that the upper limit value of the gradation values of the display-image data is 10 and the lower limit value of the gradation values of the display-image data is 0.0001.

It can be seen from FIG. 9A that the HDR image data have a dynamic range with a minimum gradation value of 0.0005 and a maximum gradation value of 5.0.

It can be seen from FIG. 9B that the base image data have a dynamic range with a minimum gradation value of 0.001 and a maximum gradation value of 1.0.

When the brightness range value YR is a value in Section 1, the dynamic range of the display-image data changes continuously from the dynamic range shown in FIG. 9F to the dynamic range shown in FIG. 9G as the brightness range value YR decreases. More specifically, display-image data having a dynamic range that is obtained by shifting the dynamic range shown in FIG. 9F to the low gradation side by a steadily larger shift amount as the brightness range value YR decreases are generated. As a result, the brightness of the display-image data decreases continuously as the brightness range value YR decreases. In FIG. 9G, the minimum gradation value of the dynamic range is limited to the lower limit value.

When the brightness range value YR is a value in Section 2, the dynamic range of the display-image data changes continuously from the dynamic range shown in FIG. 9D to the dynamic range shown in FIG. 9F as the brightness range value YR decreases. The dynamic range shown in FIG. 9D is equal to the dynamic range of the HDR image data. The maximum gradation value of the dynamic range shown in FIG. 9F is equal to the maximum gradation value of the dynamic range of the base image data, and the minimum gradation value of the dynamic range shown in FIG. 9F is equal to the minimum gradation value of the dynamic range of the HDR image data. When the brightness range value YR is larger than 25 and smaller than 75, as shown in FIG. 9E, display-image data having a dynamic range that is narrower than the dynamic range of the HDR image data and wider than the dynamic range of the base image data are generated. More specifically, when the brightness range value YR is larger than 25 and smaller than 75, display-image data having a dynamic range that satisfies following Conditions 9 and 10 are generated.

Condition 9: The maximum gradation value is smaller than the maximum gradation value of the dynamic range of the HDR image data and larger than the maximum gradation value of the dynamic range of the base image data.

Condition 10: The minimum gradation value is equal to the minimum gradation value of the dynamic range of the HDR image data.

In other words, when the brightness range value YR is a value in Section 2, the maximum gradation value of the dynamic range of the display-image data decreases continuously from the maximum gradation value of the dynamic range of the HDR image data to the gradation value of 100% white as the brightness range value YR decreases. Further, an identical value to the minimum gradation value of the dynamic range of the HDR image data is set as the minimum gradation value of the dynamic range of the display-image data, regardless of the brightness range value YR. The reason for this is that the obtained second blending ratio Blend_2 increases steadily as the gradation value of the HDR image data decreases.

Hence, when the brightness range value YR changes continuously, the gradation values in a high gradation region of the display-image data can be modified continuously from identical gradation values to the HDR image data to gradation values that are extremely close to the base image data. The high gradation region is an image region having gradation values on the high gradation side. As regards pixels having gradation values that are identical to the maximum gradation value of the dynamic range of the display-image data, the gradation values of the display-image data can be modified continuously from identical gradation values to the HDR image data to identical gradation values to the base image data.

Furthermore, an increase in the gradation values in the low gradation region accompanying a reduction in the brightness range value YR can be suppressed.

When the brightness range value YR is a value in Section 3, the dynamic range of the display-image data changes continuously from the dynamic range shown in FIG. 9D to the dynamic range shown in FIG. 9C as the brightness range value YR increases. More specifically, display-image data having a dynamic range that is obtained by shifting the dynamic range of the HDR image data to the high gradation side by a steadily larger shift amount as the brightness range value YR increases are generated. As a result, the brightness of the display-image data increases continuously as the brightness range value YR increases. In FIG. 9C, the maximum gradation value of the dynamic range is limited to the upper limit value.

According to this embodiment, as described above, the display-image data are generated so as to satisfy Conditions 1 and 2 according to the first embodiment. Further, according to this embodiment, a blending ratio corresponding to a combination of the brightness range value and the gradation value of the HDR image data is used to generate the display-image data. As a result, the dynamic range of the display-image data can be adjusted favorably. More specifically, display-image data that are identical to the HDR image data and display-image data in which the gradation values in the high gradation region are extremely close to the gradation values of the base image data can both be obtained. Furthermore, an increase in the gradation values in the low gradation region accompanying a reduction in the brightness range value can be suppressed. Moreover, the dynamic range of the display-image data can be modified continuously in a case where the brightness range value changes continuously.

Note that the correspondence relationship between the brightness range value and the first blending ratio, the correspondence relationship between the brightness range value and the second blending ratio, and the correspondence relationship between the brightness range value and the gain value are not limited to the correspondence relationships shown in FIGS. 3, 4, and 7, and as long as Conditions 1 and 2 are satisfied, any correspondence relationships may be used.

Also note that the brightness difference data are not limited to an inverse tone map, and instead, for example, the brightness difference data may be constituted by brightness ratio data.

(Third Embodiment)

An image processing apparatus and an image processing method according to a third embodiment of the present invention will now be described.

In the first and second embodiments, examples in which the display-image data are generated using the base image data and the HDR image data were described.

In this embodiment, an example in which the display-image data are generated using the base image data and the brightness difference data will be described.

Figure 10:
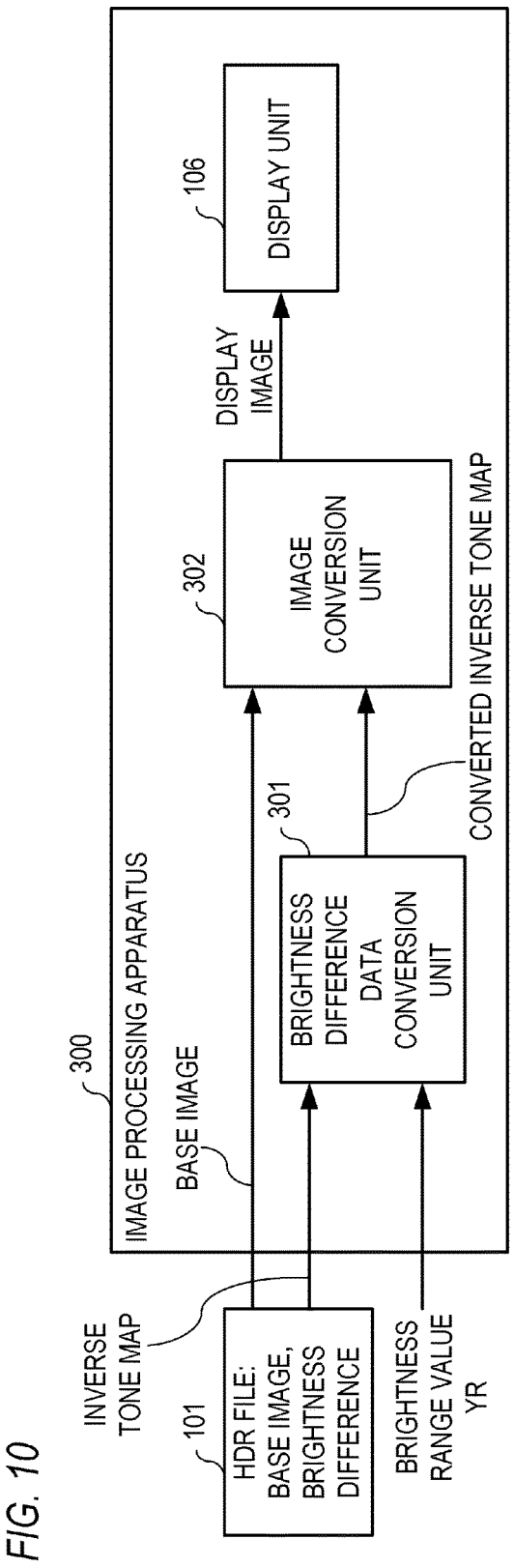
FIG. 10 is a view showing an example of a functional configuration of an image processing apparatus according to a third embodiment.

FIG. 10 is a block diagram showing an example of a functional configuration of an image processing apparatus 300 according to this embodiment.

As shown in FIG. 10, the image processing apparatus 300 includes the display unit 106, a brightness difference data conversion unit 301, an image conversion unit 302, and so on.

Note that in FIG. 10, identical functional units and data to the first embodiment (FIG. 1) have been allocated identical reference symbols to the first embodiment, and description thereof has been omitted.

Similarly to the first embodiment, the HDR file 101 and the brightness range value YR are input into the image processing apparatus 300.

In this embodiment, similarly to the first embodiment, an example of a case in which the brightness difference data included in the HDR file 101 are constituted by an inverse tone map will be described.

The display-image data are generated by the brightness difference data conversion unit 301 and the image conversion unit 302 on the basis of the base image data, the brightness difference data, and the brightness range value YR.

The brightness difference data conversion unit 301 generates corrected brightness difference data expressing a correspondence relationship between the gradation values of the base image data and the gradation values of the display-image data by correcting the gradation values of the HDR image data, which are expressed by the brightness difference data, on the basis of the brightness range value YR. In other words, the brightness difference data conversion unit 301 converts the brightness difference data into the corrected brightness difference data (converted brightness difference data) on the basis of the brightness range value YR. The brightness difference data conversion unit 301 then outputs the converted brightness difference data (a converted inverse tone map).

The image conversion unit 302 generates the display-image data by converting the gradation values of the base image data into the gradation values of display-image data using the converted inverse tone map output by the brightness difference data conversion unit 301. In other words, the image conversion unit 302 converts the base image data into the display-image data using the converted inverse tone map. The image conversion unit 302 then outputs the display-image data.

Processing performed by the brightness difference data conversion unit 301 will now be described in further detail.

In this embodiment, a plurality of lookup tables (lookup tables expressing the correspondence relationship between the gradation values of the base image data and the gradation values of the display-image data) are recorded in advance in the storage unit, not shown in the drawings.

The converted inverse tone map is generated using the plurality of lookup tables prepared in advance and the inverse tone map included in the HDR file 101.

Figure 11:
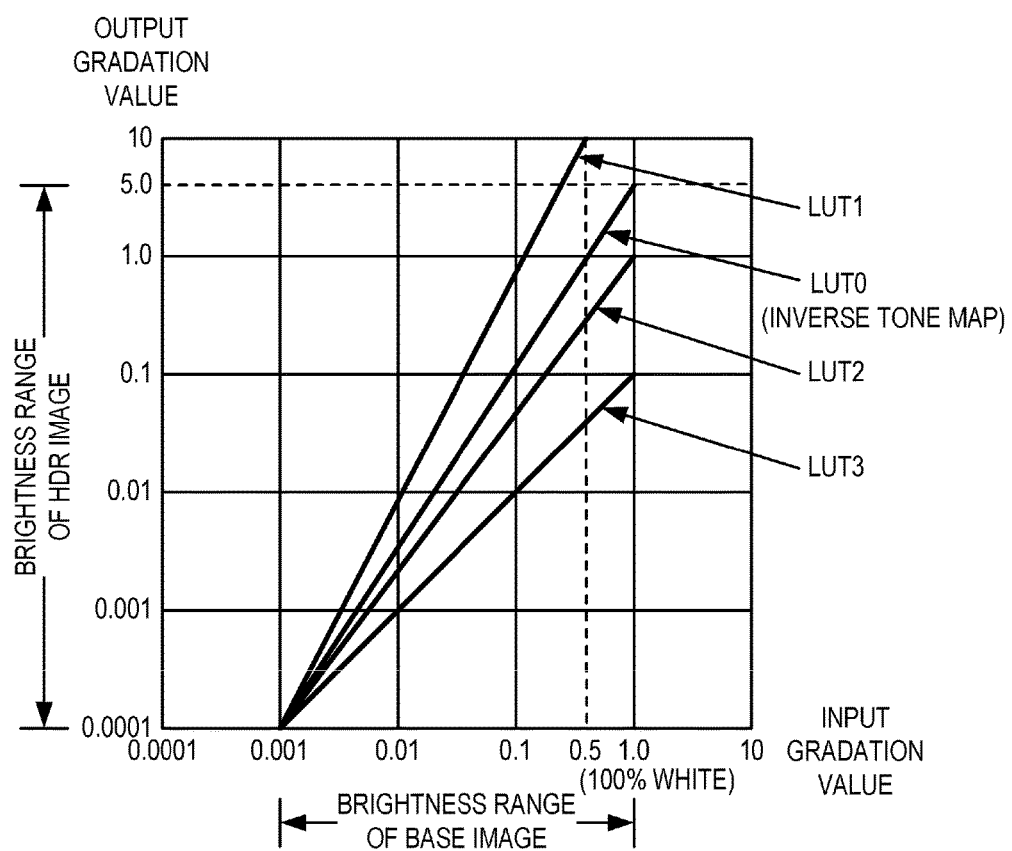
FIG. 11 is a view showing examples of lookup tables according to the third embodiment.

In this embodiment, an example of a case in which three lookup tables LUT1 to LUT3 shown in FIG. 11 are prepared in advance will be described. FIG. 11 also shows an inverse tone map LUT0 included in the HDR file 101.

In this embodiment, a converted inverse tone map LUT4 is generated using LUT0 to LUT3.

Note that the number of lookup tables prepared in advance may be larger than three.

When the brightness range value YR is the first value (75), LUT4 is generated to be identical to LUT0. Hence, when the brightness range value YR is the first value (75), identical display-image data to the HDR image data are generated.

When LUT4 that is identical to LUT0 is used, a gradation value BI=0.001 of the base image data is converted into a gradation value PI=0.0001 of the display-image data. Further, a gradation value BI=1.0 is converted into a gradation value PI=5.0. The gradation value BI is then converted into the gradation value PI such that the gradation value PI increases linearly as the gradation value BI increases. The gradation value BI=0.001 is the minimum value of the gradation values that can be taken by the base image data, and the gradation value BI=1.0 is the maximum value of the gradation values that can be taken by the base image data. The gradation value PI=0.0001 is the minimum value of the gradation values that can be taken by the HDR image data, and the gradation value PI=5.0 is the maximum value of the gradation values that can be taken by the HDR image data.

Hereafter, the minimum value of the gradation values that can be taken by the base image data and the maximum value of the gradation values that can be taken by the base image data will be referred to respectively as a "base minimum value" and a "base maximum value". Further, the minimum value of the gradation values that can be taken by the HDR image data and the maximum value of the gradation values that can be taken by the HDR image data will be referred to respectively as an "HDR minimum value" and an "HDR maximum value".

When the brightness range value YR is 100, LUT4 is generated to be identical to LUT1.

When LUT4 that is identical to LUT1 is used, a gradation value PI that is larger than the HDR maximum value (the gradation value HI=5.0) is obtained as the gradation value PI corresponding to the gradation value BI=1.0. Specifically, the gradation value PI increases as the gradation value BI increases such that the gradation value PI reaches the upper limit value when the gradation value BI increases to a predetermined gradation value that is smaller than the base maximum value. More specifically, in a gradation range of 0.001≤the gradation value BI≤0.5, the gradation value BI is converted into the gradation value PI such that the gradation value PI increases linearly from 0.001 to 10 (the upper limit value) as the gradation value BI increases. In a gradation range of 0.5≤the gradation value BI, the gradation value BI is converted into the gradation value PI=10 (the upper limit value).

When the brightness range value YR is the second value (25), LUT4 is generated to be identical to LUT2.

When LUT4 that is identical to LUT2 is used, the gradation value BI=0.001 is converted into the gradation value PI=0.0001, and the gradation value BI=1.0 is converted into the gradation value PI=1.0. In other words, a gradation value PI that is equal to the base maximum value is obtained as the gradation value PI corresponding to the gradation value BI=1.0. The gradation value BI is then converted into the gradation value PI such that the gradation value PI increases linearly as the gradation value BI increases.

When the brightness range value YR is 0, LUT4 is generated to be identical to LUT3.

When LUT4 that is identical to LUT3 is used, the gradation value BI=0.001 is converted into the gradation value PI=0.0001, and the gradation value BI=1.0 is converted into the gradation value PI=0.1. In other words, a smaller gradation value PI than the base maximum value is obtained as the gradation value PI corresponding to the gradation value BI=1.0. The gradation value BI is then converted into the gradation value PI such that the gradation value PI increases linearly as the gradation value BI increases.

The HDR minimum value is highly likely to correspond to the lower limit value of the gradation values of the display-image data. Further, the upper limit value and lower limit value of the gradation values of the display-image data and the dynamic range of the image data (the base image data) input into the image processing apparatus can be learned in advance. Accordingly, this information can be used to generate LUT1 to LUT3 in advance.

Note that the plurality of lookup tables (the lookup tables expressing the correspondence relationship between the gradation values of the base image data and the gradation values of the display-image data) need not be prepared in advance. For example, the dynamic range of the base image data and the dynamic range of the HDR image data may be learned from the inverse tone map LUT0. The plurality of lookup tables may then be generated on the basis of the dynamic range of the base image data, the dynamic range of the HDR image data, and the upper limit value and lower limit value of the gradation values of the display-image data. In so doing, a more favorable plurality of lookup tables can be generated in a case where the dynamic range of the HDR image data or the dynamic range of the base image data changes.

Figure 12:
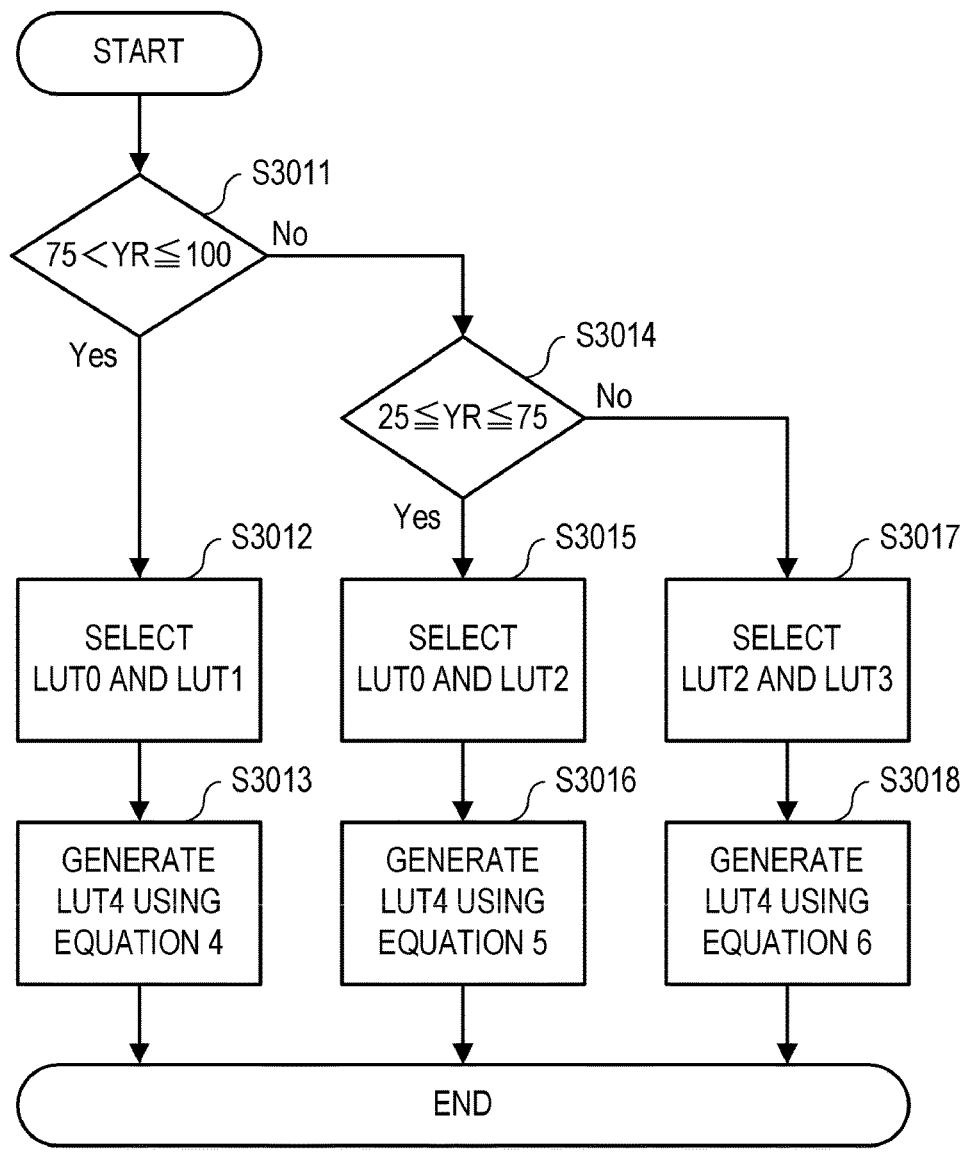
FIG. 12 is a view showing an example of a flow of processing executed by a brightness difference data conversion unit according to the third embodiment.

Using FIG. 12, an example of a flow of processing performed by the brightness difference data conversion unit 301 will be described. FIG. 12 is a flowchart showing an example of a flow of the processing performed by the brightness difference data conversion unit 301.

First, the brightness difference data conversion unit 301 determines whether or not the first value (75)<the brightness range value YR≤100 (S3011). In other words, the brightness difference data conversion unit 301 determines whether or not the brightness range value YR is a value in Section 3. When the brightness range value YR is a value in Section 3, the processing advances to S3012, and when the brightness range value YR is not a value in Section 3, the processing advances to S3014.

In S3012, the brightness difference data conversion unit 301 selects LUT0 and LUT1. The processing then advances to S3013.

In S3013, the brightness difference data conversion unit 301 generates LUT4 by combining LUT0 with LUT1 using a weighting corresponding to the brightness range value YR. More specifically, LUT4 is generated using Equation 4, shown below.

$$\text{LUT4}=((YR-75)/25)\times\text{LUT1}+((100-YR)/25)\times\text{LUT0} \quad \text{(Equation 4)}$$

In S3014, the brightness difference data conversion unit 301 determines whether or not the second value (25)≤the brightness range value YR≤the first value (75). In other words, the brightness difference data conversion unit 301 determines whether or not the brightness range value YR is a value in Section 2. When the brightness range value YR is a value in Section 2, the processing advances to S3015, and when the brightness range value YR is not a value in Section 2, the processing advances to S3017.

In S3015, the brightness difference data conversion unit 301 selects LUT0 and LUT2. The processing then advances to S3016.

In S3016, the brightness difference data conversion unit 301 generates LUT4 by combining LUT0 with LUT2 using a weighting corresponding to the brightness range value YR. More specifically, LUT4 is generated using Equation 5, shown below.

$$\text{LUT4}=((YR-25)/50)\times\text{LUT0}+((75-YR)/50)\times\text{LUT2} \quad \text{(Equation 5)}$$

In S3017, the brightness difference data conversion unit 301 determines whether or not 0≤the brightness range value YR<the second value (25), and selects LUT2 and LUT3. More specifically, in S3017, the brightness range value YR is determined to be a value in Section 1, and therefore LUT2 and LUT3 are selected. The processing then advances to S3018.

In S3018, the brightness difference data conversion unit 301 generates LUT4 by combining LUT2 with LUT3 using a weighting corresponding to the brightness range value YR. More specifically, LUT4 is generated using Equation 6, shown below.

$$\text{LUT4}=(YR/25)\times\text{LUT2}+((25-YR)/25)\times\text{LUT3} \quad \text{(Equation 6)}$$

The image conversion unit 302 converts the gradation value BI of the base image data into the gradation value PI of the display-image data using Equation 7, shown below. In Equation 7, x in LUT4 (x) denotes the input gradation value of LUT4.

$$PI=\text{LUT4}(BI) \quad \text{(Equation 7)}$$

Hence, in this embodiment, two LUTs (a first LUT and a second LUT) are selected from the plurality of LUTs prepared in advance and the LUT (the inverse tone map) included in the HDR file 101. LUT4 (the converted inverse tone map) is then generated by combining the first LUT with the second LUT using a weighting corresponding to the brightness range value YR.

As a result, the first LUT, the second LUT, or an intermediate LUT can be generated as LUT4. The intermediate LUT is a LUT having a conversion characteristic (a characteristic expressing change in the gradation value PI relative to change in the gradation value BI) between the conversion characteristic of the first LUT and the conversion characteristic of the second LUT.

When the brightness range value YR is a value in Section 1, the converted inverse tone map is generated so as to satisfy Conditions 11 and 12, shown below.

Condition 11: The gradation value of the display-image data corresponding to the base maximum value is smaller than the maximum value of the gradation values that can be taken by the HDR image data.

Condition 12: The gradation value of the display-image data corresponding to the base maximum value decreases steadily as the brightness range value YR decreases.

When the brightness range value YR is a value in Section 2, the inverse tone map is generated such that the gradation value of the display-image data corresponding to the base maximum value steadily approaches the base maximum value as the brightness range value YR decreases. Note that when the brightness range value YR is the first value (75), an identical converted inverse tone map to the inverse tone map included in the HDR file 101 is generated.

When the brightness range value YR is a value in Section 3, the converted inverse tone map is generated so as to satisfy Conditions 13 and 14, shown below.

Condition 13: The gradation value of the display-image data corresponding to the base maximum value equals or exceeds the HDR maximum value.

Condition 14: The gradation value of the display-image data corresponding to the base maximum value increases steadily as the brightness range value YR increases.

Using FIGS. 13A to 13G, the display-image data according to this embodiment and the dynamic range thereof will be described in more detail.

FIGS. 13A to 13G are views showing examples of image data and dynamic ranges (brightness ranges) thereof according to this embodiment. In FIGS. 13A to 13G, numerals depicted on the image data (the images represented by the image data) indicate the gradation values of the regions in which the numerals are depicted.

FIGS. 13A to 13G show examples of a case in which the LUTs shown in FIG. 11 are used.

Figure 13A:
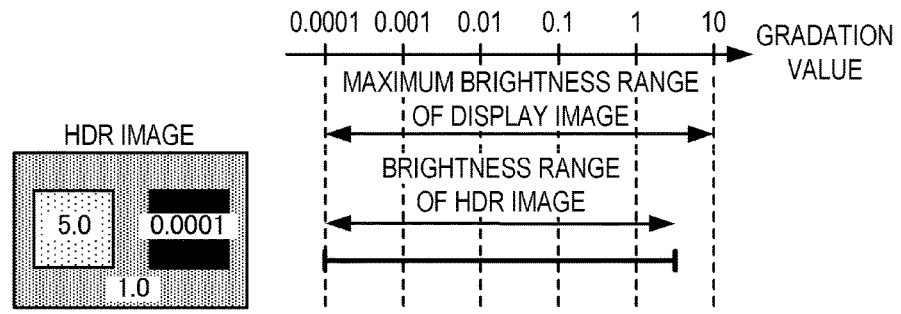
FIGS. 13A to 13G are views showing examples of image data and dynamic ranges thereof according to the third embodiment.

FIG. 13A shows the HDR image data and the dynamic range thereof.

Figure 13B:
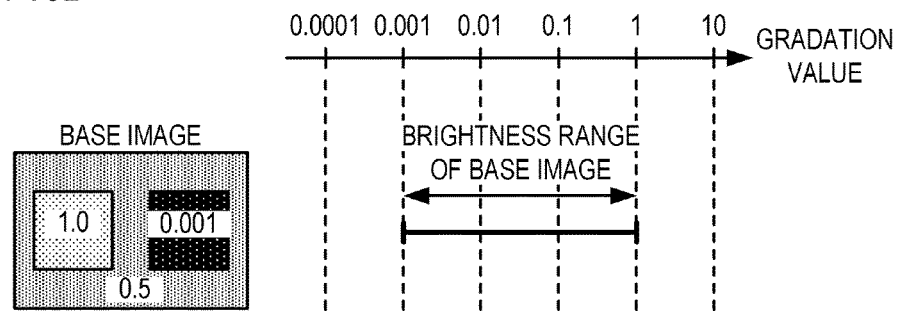

FIG. 13B shows the base image data and the dynamic range thereof.

Figure 13C:
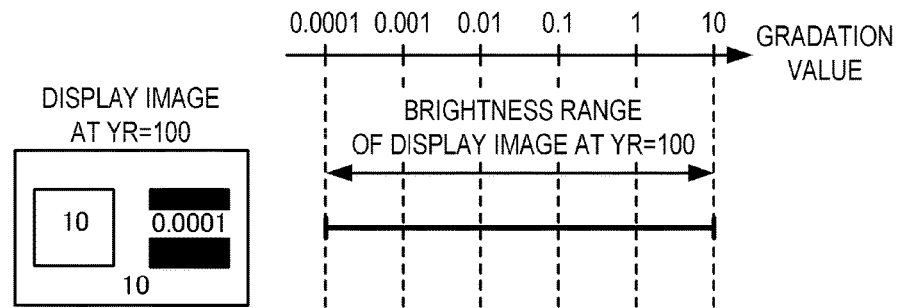

FIG. 13C shows the display-image data when the brightness range value YR=100 and the dynamic range thereof.

Figure 13D:
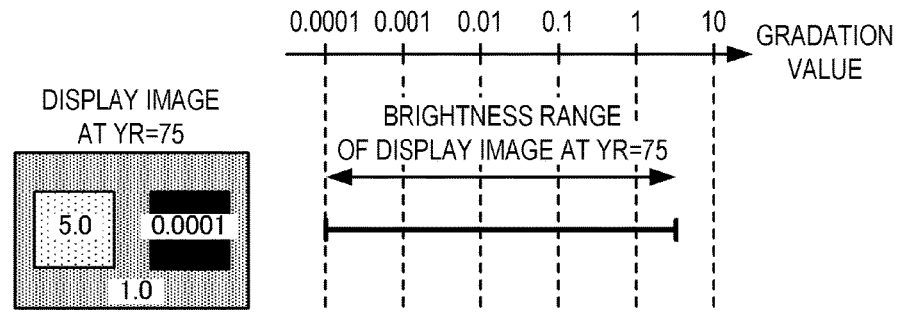

FIG. 13D shows the display-image data when the brightness range value YR=75 and the dynamic range thereof.

Figure 13E:
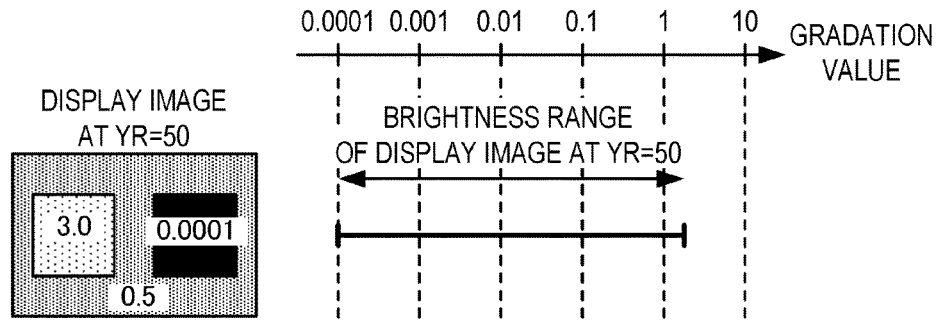

FIG. 13E shows the display-image data when the brightness range value YR=50 and the dynamic range thereof.

Figure 13F:
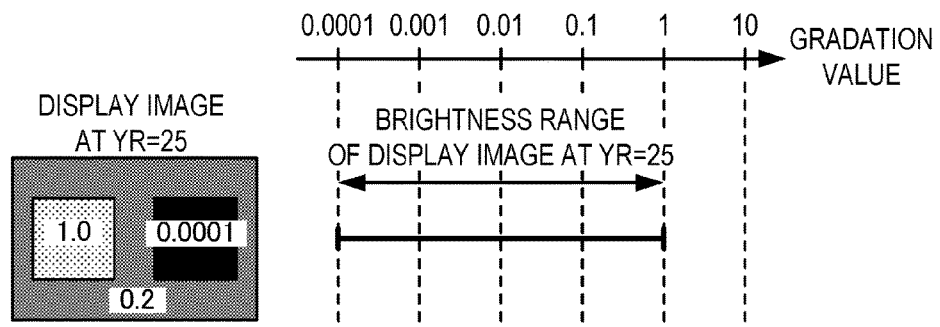

FIG. 13F shows the display-image data when the brightness range value YR=25 and the dynamic range thereof.

Figure 13G:
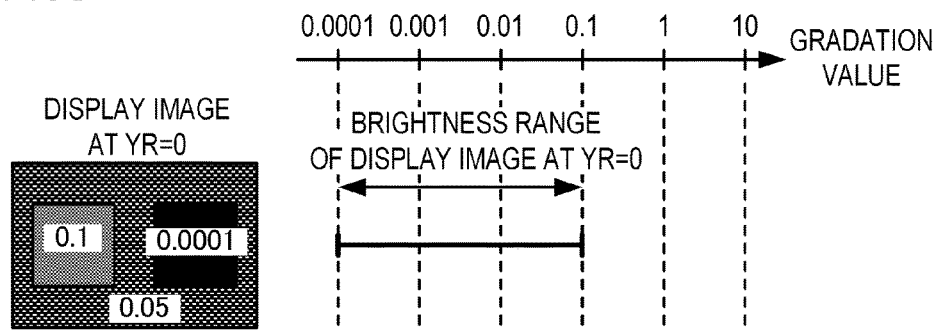

FIG. 13G shows the display-image data when the brightness range value YR=0 and the dynamic range thereof.

It can be seen from FIGS. 13A to 13G that the upper limit value of the gradation values of the display-image data is 10 and the lower limit value of the gradation values of the display-image data is 0.0001.

It can be seen from FIG. 13A that the HDR image data have a dynamic range with a minimum gradation value of 0.0005 and a maximum gradation value of 5.0.

It can be seen from FIG. 13B that the base image data have a dynamic range with a minimum gradation value of 0.001 and a maximum gradation value of 1.0.

When the brightness range value YR is a value in Section 1, the dynamic range of the display-image data changes continuously from the dynamic range shown in FIG. 13F to the dynamic range shown in FIG. 13G as the brightness range value YR decreases. More specifically, the maximum gradation value of the dynamic range of the display-image data decreases continuously from the gradation value of 100% white as the brightness range value YR decreases. Further, an identical value to the minimum gradation value of the dynamic range of the HDR image data is set as the minimum gradation value of the dynamic range of the display-image data, regardless of the brightness range value YR. As a result, the brightness of the display-image data decreases continuously as the brightness range value YR decreases.

When the brightness range value YR is a value in Section 2, the dynamic range of the display-image data changes continuously from the dynamic range shown in FIG. 13D to the dynamic range shown in FIG. 13F as the brightness range value YR decreases. The dynamic range shown in FIG. 13D is equal to the dynamic range of the HDR image data. Further, the maximum gradation value of the dynamic range shown in FIG. 13F is equal to the maximum gradation value of the dynamic range of the base image data, and the minimum gradation value of the dynamic range shown in FIG. 13F is equal to the minimum gradation value of the dynamic range of the HDR image data. When the brightness range value YR is larger than 25 and smaller than 75, as shown in FIG. 13E, display-image data having a dynamic range that is narrower than the dynamic range of the HDR image data and wider than the dynamic range of the base image data are generated. More specifically, when the brightness range value YR is larger than 25 and smaller than 75, display-image data having a dynamic range that satisfies following Conditions 15 and 16 are generated.

Condition 15: The maximum gradation value is smaller than the maximum gradation value of the dynamic range of the HDR image data and larger than the maximum gradation value of the dynamic range of the base image data.

Condition 16: The minimum gradation value is equal to the minimum gradation value of the dynamic range of the HDR image data.

In other words, when the brightness range value YR is a value in Section 2, the maximum gradation value of the dynamic range of the display-image data decreases continuously from the maximum gradation value of the dynamic range of the HDR image data to the gradation value of 100% white as the brightness range value YR decreases. Further, an identical value to the minimum gradation value of the dynamic range of the HDR image data is set as the minimum gradation value of the dynamic range of the display-image data, regardless of the brightness range value YR.

Hence, when the brightness range value YR changes continuously, the gradation values in the high gradation region of the display-image data can be modified continuously from gradation values that are identical to the HDR image data to gradation values that are extremely close to the base image data. As regards pixels having gradation values that are identical to the maximum gradation value of the dynamic range of the display-image data, the gradation values of the display-image data can be modified continuously from identical gradation values to the HDR image data to identical gradation values to the base image data.

Furthermore, an increase in the gradation values in the low gradation region accompanying a reduction in the brightness range value YR can be suppressed.

When the brightness range value YR is a value in Section 3, the dynamic range of the display-image data changes continuously from the dynamic range shown in FIG. 13D to the dynamic range shown in FIG. 13C as the brightness range value YR increases. More specifically, the maximum gradation value of the dynamic range of the display-image data increases continuously from the maximum gradation value of the dynamic range of the HDR image data as the brightness range value YR increases. Further, an identical value to the minimum gradation value of the dynamic range of the HDR image data is set as the minimum gradation value of the dynamic range of the display-image data, regardless of the brightness range value YR. As a result, the brightness of the display-image data increases continuously as the brightness range value YR increases.

According to this embodiment, as described above, the brightness difference data are corrected to the corrected brightness difference data in accordance with the brightness range value YR. The base image data are then converted into the display-image data using the corrected brightness difference data. As a result, the dynamic range of the display-image data can be adjusted favorably.

Note that the inverse tone map and the plurality of lookup tables are not limited to the LUTs 0 to 4 shown in FIG. 11, and as long as Conditions 1 and 2 described in the first embodiment are satisfied, lookup tables (including the inverse tone map) having any desired conversion characteristics may be used. The correspondence relationship between the gradation value BI and the gradation value PI, which is defined by the inverse tone map and the plurality of lookup tables, may be set such that the gradation value PI increases nonlinearly as the gradation value BI increases.

Note that the method of correcting the brightness difference data is not limited to the method described above. For example, the corrected brightness difference data may be generated by correcting the brightness difference data using a correction value that corresponds to the brightness range value YR instead of the plurality of LUTs.

Also note that the brightness difference data are not limited to an inverse tone map, and instead, for example, the brightness difference data may be constituted by brightness ratio data.

(Fourth Embodiment)

An image processing apparatus and an image processing method according to a fourth embodiment of the present invention will be described below.

In the third embodiment, an example in which the display-image data are generated using the base image data and the brightness difference data was described.

In this embodiment, an example in which the display-image data are generated using the HDR image data and the brightness difference data will be described.

Figure 14:
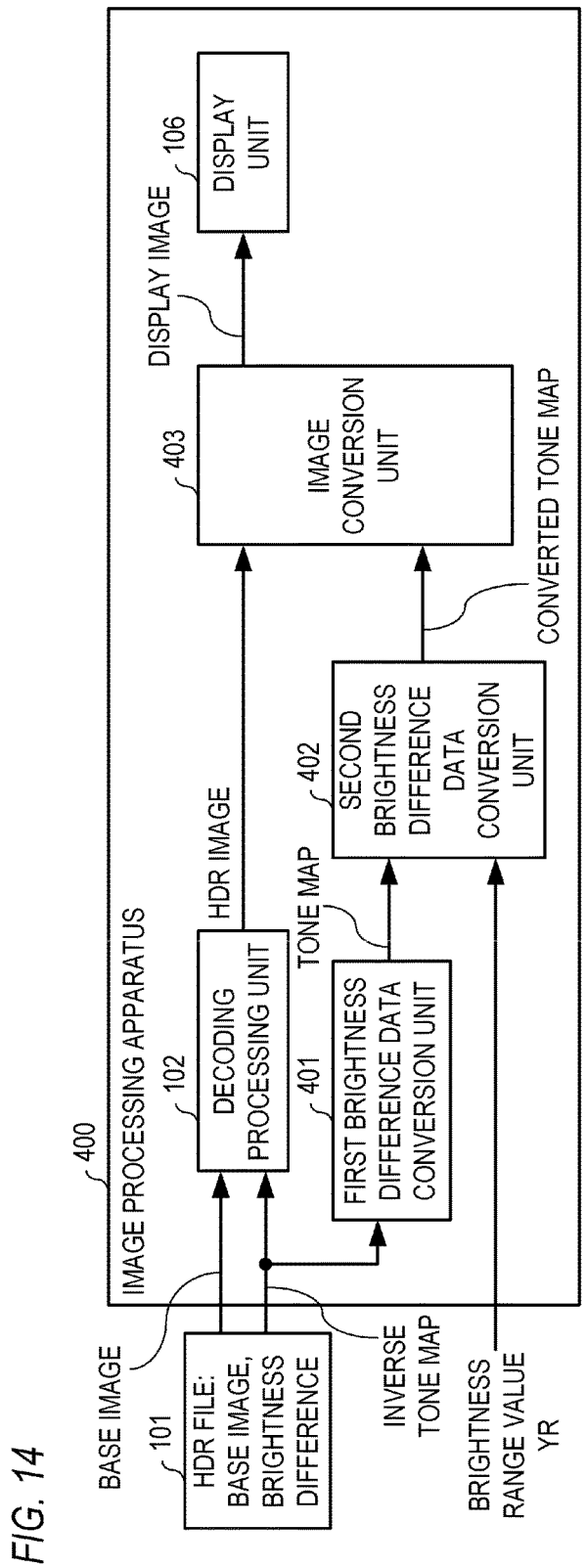
FIG. 14 is a view showing an example of a functional configuration of an image processing apparatus according to a fourth embodiment.

FIG. 14 is a block diagram showing an example of a functional configuration of an image processing apparatus 400 according to this embodiment.

As shown in FIG. 14, the image processing apparatus 400 includes the decoding processing unit 102, the display unit 106, a first brightness difference data conversion unit 401, a second brightness difference data conversion unit 402, an image conversion unit 403, and so on.

Note that in FIG. 14, identical functional units and data to the first embodiment (FIG. 1) have been allocated identical reference symbols to the first embodiment, and description thereof has been omitted.

Similarly to the first embodiment, the HDR file 101 and the brightness range value YR are input into the image processing apparatus 400.

In this embodiment, similarly to the first embodiment, an example of a case in which the brightness difference data (first brightness difference data) included in the HDR file 101 are constituted by an inverse tone map will be described.

The first brightness difference data conversion unit 401 generates second brightness difference data by switching an input gradation value and an output gradation value of the first brightness difference data. The first brightness difference data conversion unit 401 then outputs the second brightness difference data. In this embodiment, the inverse tone map is converted into a tone map.

Note that a data file including the HDR image data and the second brightness difference data may be input into the image processing apparatus 400 instead of the HDR file 101. In this case, the decoding processing unit 102 and the first brightness difference data conversion unit 401 are not required.

The display-image data are generated by the second brightness difference data conversion unit 402 and the image conversion unit 403 on the basis of the HDR image data, the second brightness difference data, and the brightness range value YR.

The second brightness difference data conversion unit 402 generates corrected brightness difference data expressing a correspondence relationship between the gradation values of the HDR image data and the gradation values of the display-image data by correcting the gradation values of the base image data, which are expressed by the second brightness difference data, on the basis of the brightness range value YR. In other words, the second brightness difference data conversion unit 402 converts the second brightness difference data into the corrected brightness difference data (converted brightness difference data) on the basis of the brightness range value YR. The second brightness difference data conversion unit 402 then outputs the converted brightness difference data (a converted tone map).

The image conversion unit 403 generates the display-image data by converting the gradation values of the HDR image data into the gradation values of the display-image data using the converted tone map output by the second brightness difference data conversion unit 402. In other words, the image conversion unit 403 converts the HDR image data into the display-image data using the converted tone map. The image conversion unit 403 then outputs the display-image data.

Processing performed by the second brightness difference data conversion unit 402 will now be described in further detail.

In this embodiment, a plurality of lookup tables (lookup tables expressing the correspondence relationship between the gradation values of the HDR image data and the gradation values of the display-image data) are recorded in advance in the storage unit, not shown in the drawings.

The converted tone map is generated using the plurality of lookup tables prepared in advance and the tone map generated by the first brightness difference data conversion unit 402.

Figure 15:
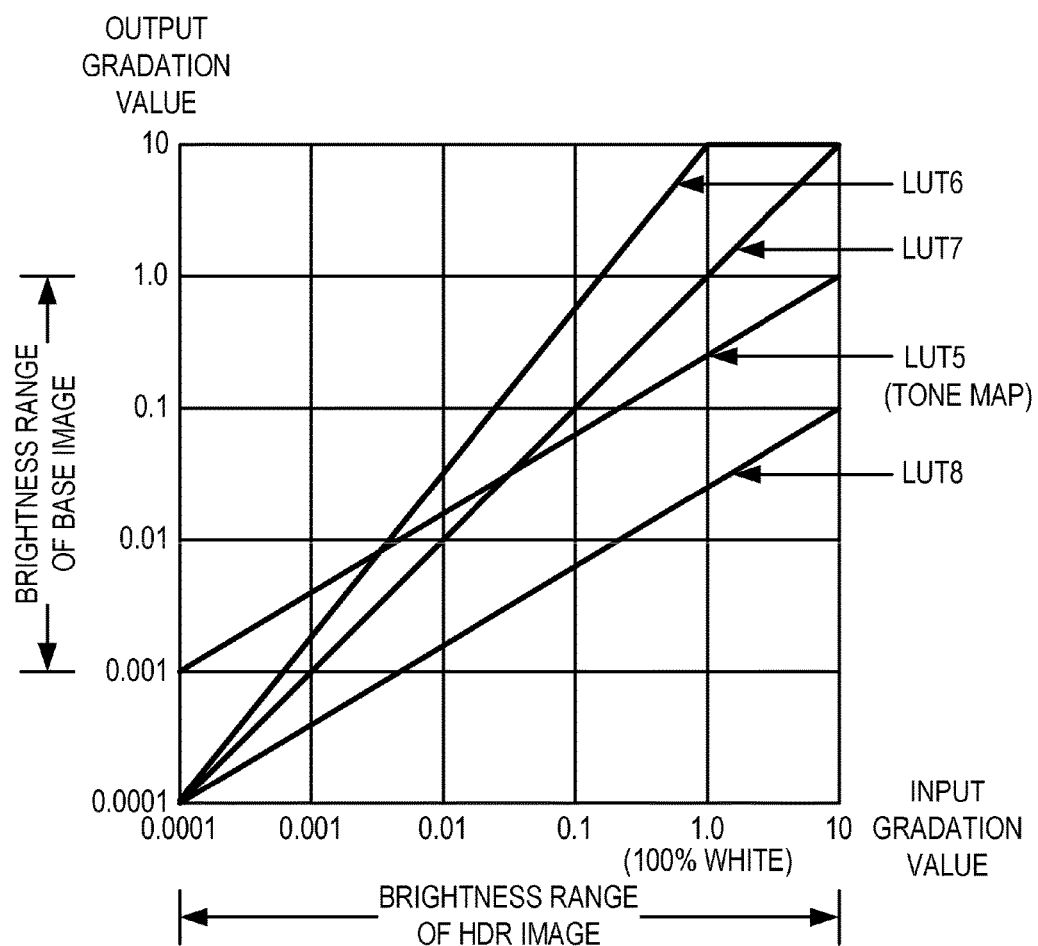
FIG. 15 is a view showing examples of lookup tables according to the fourth embodiment.

In this embodiment, an example of a case in which three lookup tables LUT6 to LUT8 shown in FIG. 15 are prepared in advance will be described. FIG. 15 also shows a tone map LUT5 generated by the first brightness difference data conversion unit 402.

In this embodiment, a converted tone map LUT9 is generated using LUT5 to LUT8.

Note that the number of lookup tables prepared in advance may be larger than three.

When the brightness range value YR is the second value (25), LUT9 is generated to be identical to LUT5. Hence, when the brightness range value YR is the second value (25), identical display-image data to the base image data are generated.

When LUT9 that is identical to LUT5 is used, a gradation value HI=0.0001 of the HDR image data is converted into a gradation value PI=0.001 of the display-image data. Further, a gradation value HI=10 is converted into a gradation value PI=1.0. The gradation value HI is then converted into the gradation value PI such that the gradation value PI increases linearly as the gradation value HI increases. The gradation value HI=0.0001 serves as the HDR minimum value, and the gradation value HI=10 serves as the HDR maximum value, i.e. the upper limit value of the gradation values of the display-image data. The gradation value PI=0.001 serves as the base minimum value, and the gradation value PI=1.0 serves as the base maximum value.

When the brightness range value YR is 100, LUT9 is generated to be identical to LUT6.

When LUT9 that is identical to LUT6 is used, the gradation value PI increases as the gradation value HI increases such that the gradation value PI reaches the upper limit value when the gradation value HI increases to a predetermined gradation value that is smaller than the HDR maximum value. More specifically, in a gradation range of 0.0001≤the gradation value HI≤1.0, the gradation value HI is converted into the gradation value PI such that the gradation value PI increases linearly from 0.0001 to (the upper limit value) as the gradation value HI increases. Further, in a gradation range of 1.0≤the gradation value HI, the gradation value HI is converted into the gradation value PI=10 (the upper limit value).

When the brightness range value YR is the first value (75), LUT9 is generated to be identical to LUT7.

When LUT9 that is identical to LUT7 is used, the gradation value HI=0.0001 is converted into the gradation value PI=0.0001, and the gradation value HI=10 is converted into the gradation value PI=10. The gradation value HI is then converted into the gradation value PI such that the gradation value HI increases linearly as the gradation value HI increases. In other words, when LUT9 that is identical to LUT7 is used, the gradation value HI is not converted, and an identical value to the gradation value HI is obtained as the gradation value PI. Hence, when LUT9 that is identical to LUT7 is used, identical display-image data to the HDR image data are generated.

When the brightness range value YR is 0, LUT9 is generated to be identical to LUT8.

When LUT9 that is identical to LUT8 is used, the gradation value HI=0.0001 is converted into the gradation value PI=0.0001, and the gradation value HI=10 is converted into the gradation value PI=0.1. In other words, a smaller gradation value PI than the base maximum value is obtained as the gradation value PI corresponding to the gradation value HI=10. The gradation value HI is then converted into the gradation value PI such that the gradation value PI increases linearly as the gradation value HI increases.

The HDR minimum value is highly likely to correspond to the lower limit value of the gradation values of the display-image data, while the HDR maximum value is highly likely to correspond to the upper limit value of the gradation values of the display-image data. The base maximum value is highly likely to correspond to a predetermined value (1.0). Further, the upper limit value and lower limit value of the gradation values of the display-image data can be learned in advance. Accordingly, this information can be used to generate LUT6 to LUT8 in advance.

Note that the plurality of lookup tables (the lookup tables expressing the correspondence relationship between the gradation values of the HDR image data and the gradation values of the display-image data) need not be prepared in advance. For example, the dynamic range of the base image data and the dynamic range of the HDR image data may be learned from the tone map LUT5. The plurality of lookup tables may then be generated on the basis of the dynamic range of the base image data, the dynamic range of the HDR image data, and the upper limit value and lower limit value of the gradation values of the display-image data. In so doing, a more favorable plurality of lookup tables can be generated in a case where the dynamic range of the HDR image data or the dynamic range of the base image data changes.

Figure 16:
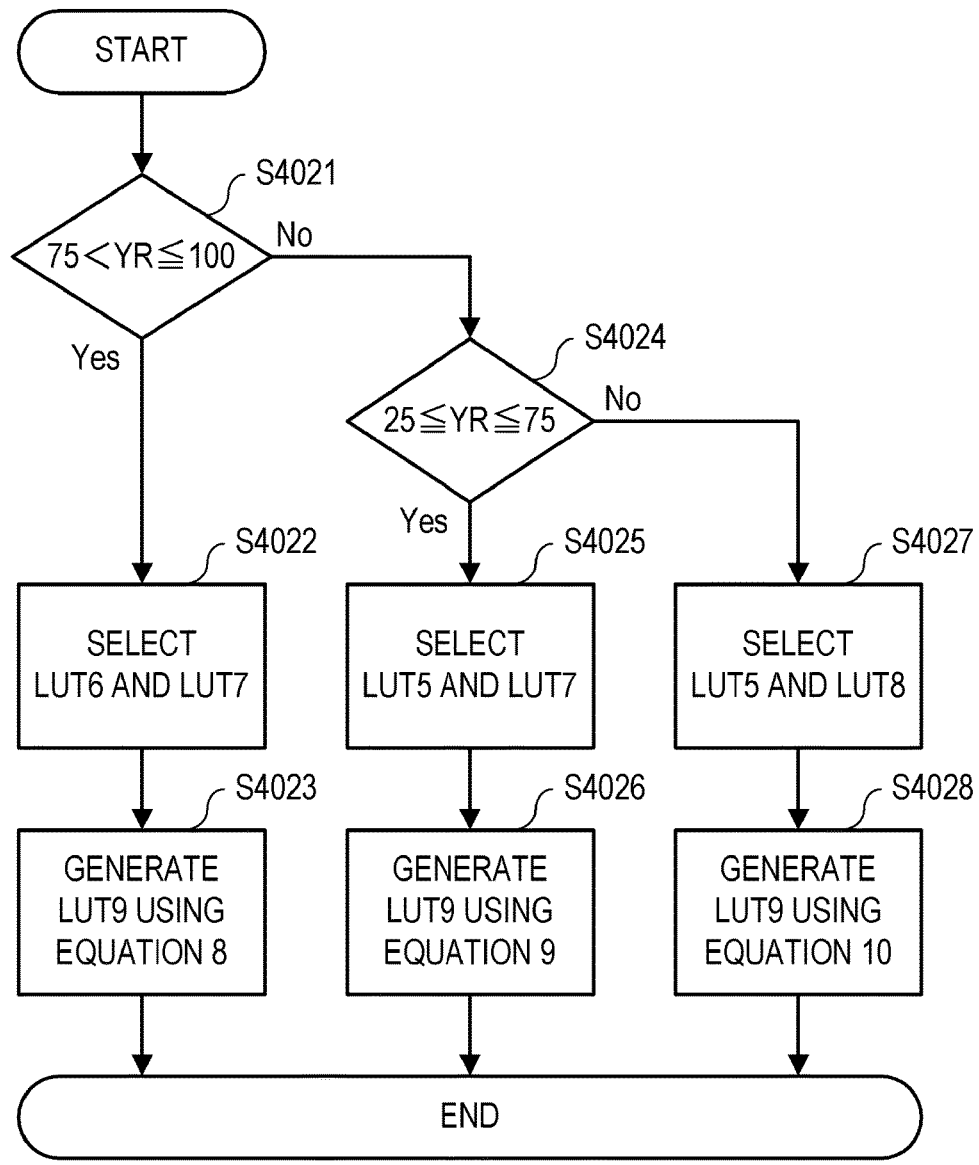
FIG. 16 is a view showing an example of a flow of processing executed by a second brightness difference data conversion unit according to the fourth embodiment.

Using FIG. 16, an example of a flow of processing performed by the second brightness difference data conversion unit 402 will be described. FIG. 16 is a flowchart showing an example of a flow of the processing performed by the second brightness difference data conversion unit 402.

First, the second brightness difference data conversion unit 402 determines whether or not the first value (75)<the brightness range value YR≤100 (S4021). In other words, the second brightness difference data conversion unit 402 determines whether or not the brightness range value YR is a value in Section 3. When the brightness range value YR is a value in Section 3, the processing advances to S4022, and when the brightness range value YR is not a value in Section 3, the processing advances to S4024.

In S4022, the second brightness difference data conversion unit 402 selects LUT6 and LUT7. The processing then advances to S4023.

In S4023, the second brightness difference data conversion unit 402 generates LUT9 by combining LUT6 with LUT7 using a weighting corresponding to the brightness range value YR. More specifically, LUT9 is generated using Equation 8, shown below.

$$LUT9 = ((YR-75)/25) \times LUT6 + ((100-YR)/25) \times LUT7 \quad \text{(Equation 8)}$$

In S4024, the second brightness difference data conversion unit 402 determines whether or not the second value (25)≤the brightness range value YR≤the first value (75). In other words, the second brightness difference data conversion unit 402 determines whether or not the brightness range value YR is a value in Section 2. When the brightness range value YR is a value in Section 2, the processing advances to S4025, and when the brightness range value YR is not a value in Section 2, the processing advances to S4027.

In S4025, the second brightness difference data conversion unit 402 selects LUT5 and LUT7. The processing then advances to S4026.

In S4026, the second brightness difference data conversion unit 402 generates LUT9 by combining LUT5 with LUT7 using a weighting corresponding to the brightness range value YR. More specifically, LUT9 is generated using Equation 9, shown below.

$$LUT9=((YR-25)/50)\times LUT7+((75-YR)/50)\times LUT5 \qquad \text{(Equation 9)}$$

In S4027, the second brightness difference data conversion unit 402 determines whether or not 0≤the brightness range value YR<the second value (25), and selects LUT5 and LUT8. More specifically, in S4027, the brightness range value YR is determined to be a value in Section 1, and therefore LUT5 and LUT8 are selected. The processing then advances to S4028.

In S4028, the second brightness difference data conversion unit 402 generates LUT9 by combining LUT5 with LUT8 using a weighting corresponding to the brightness range value YR. More specifically, LUT9 is generated using Equation 10, shown below.

$$LUT9=(YR/25)\times LUT5+((25-YR)/25)\times LUT8 \qquad \text{(Equation 10)}$$

The image conversion unit 302 converts the gradation value HI of the HDR image data into the gradation value PI of the display-image data using Equation 11, shown below. In Equation 11, x in LUT9 (x) denotes the input gradation value of LUT9.

$$PI=LUT9(HI) \qquad \text{(Equation 11)}$$

Hence, in this embodiment, two LUTs (a first LUT and a second LUT) are selected from the plurality of LUTs prepared in advance and the LUT (the tone map) generated by the first brightness difference data conversion unit 402. LUT9 (the converted tone map) is then generated by combining the first LUT with the second LUT using a weighting corresponding to the brightness range value YR.

As a result, the first LUT, the second LUT, or an intermediate LUT can be generated as LUT9.

When the brightness range value YR is a value in Section 1, the converted tone map is generated so as to satisfy Conditions 17 and 18, shown below.

Condition 17: The gradation value of the display-image data corresponding to the HDR maximum value is smaller than the base maximum value.

Condition 18: The gradation value of the display-image data corresponding to the HDR maximum value decreases steadily as the brightness range value YR decreases.

When the brightness range value YR is a value in Section 2, the converted tone map is generated so as to satisfy Conditions 19 and 20, shown below. Note that when the brightness range value YR is the second value (25), an identical converted tone map to the tone map generated by the first brightness difference data conversion unit 402 is generated.

Condition 19: The gradation value of the display-image data corresponding to the HDR maximum value steadily approaches the HDR maximum value as the brightness range value YR increases.

Condition 20: The gradation value of the display-image data corresponding to the HDR minimum value steadily approaches the HDR minimum value as the brightness range value YR increases.

When the brightness range value YR is a value in Section 3, the converted inverse tone map is generated so as to satisfy Conditions 21 and 22, shown below.

Condition 21: The gradation value of the display-image data corresponding to the HDR maximum value equals or exceeds the HDR maximum value.

Condition 22: The gradation value of the display-image data corresponding to the HDR maximum value increases steadily as the brightness range value YR increases.

According to this embodiment, as described above, the brightness difference data (the second brightness difference data) are corrected to the corrected brightness difference data in accordance with the brightness range value YR. The HDR image data are then converted into the display-image data using the corrected brightness difference data. As a result, the dynamic range of the display-image data can be adjusted favorably.

Note that the tone map and the plurality of lookup tables are not limited to the LUTs 5 to 8 shown in FIG. 15, and as long as Conditions 1 and 2 described in the first embodiment are satisfied, lookup tables (including the tone map) having any desired conversion characteristics may be used. The correspondence relationship between the gradation value HI and the gradation value PI, which is defined by the tone map and the plurality of lookup tables, may be set such that the gradation value PI increases nonlinearly as the gradation value HI increases.

Note that the method of correcting the second brightness difference data is not limited to the method described above. For example, the corrected brightness difference data may be generated by correcting the second brightness difference data using a correction value that corresponds to the brightness range value YR instead of using the plurality of LUTs.

Also note that the brightness difference data are not limited to an inverse tone map or a tone map, and instead, for example, the brightness difference data may be constituted by brightness ratio data.

(Fifth Embodiment)

An image processing apparatus and an image processing method according to a fifth embodiment of the present invention will be described below.

In the first to fourth embodiments, examples in which the brightness range value YR is determined in accordance with a user operation were described.

In this embodiment, an example in which the brightness range value YR is determined in accordance with the brightness of the HDR image data will be described.

Figure 17:
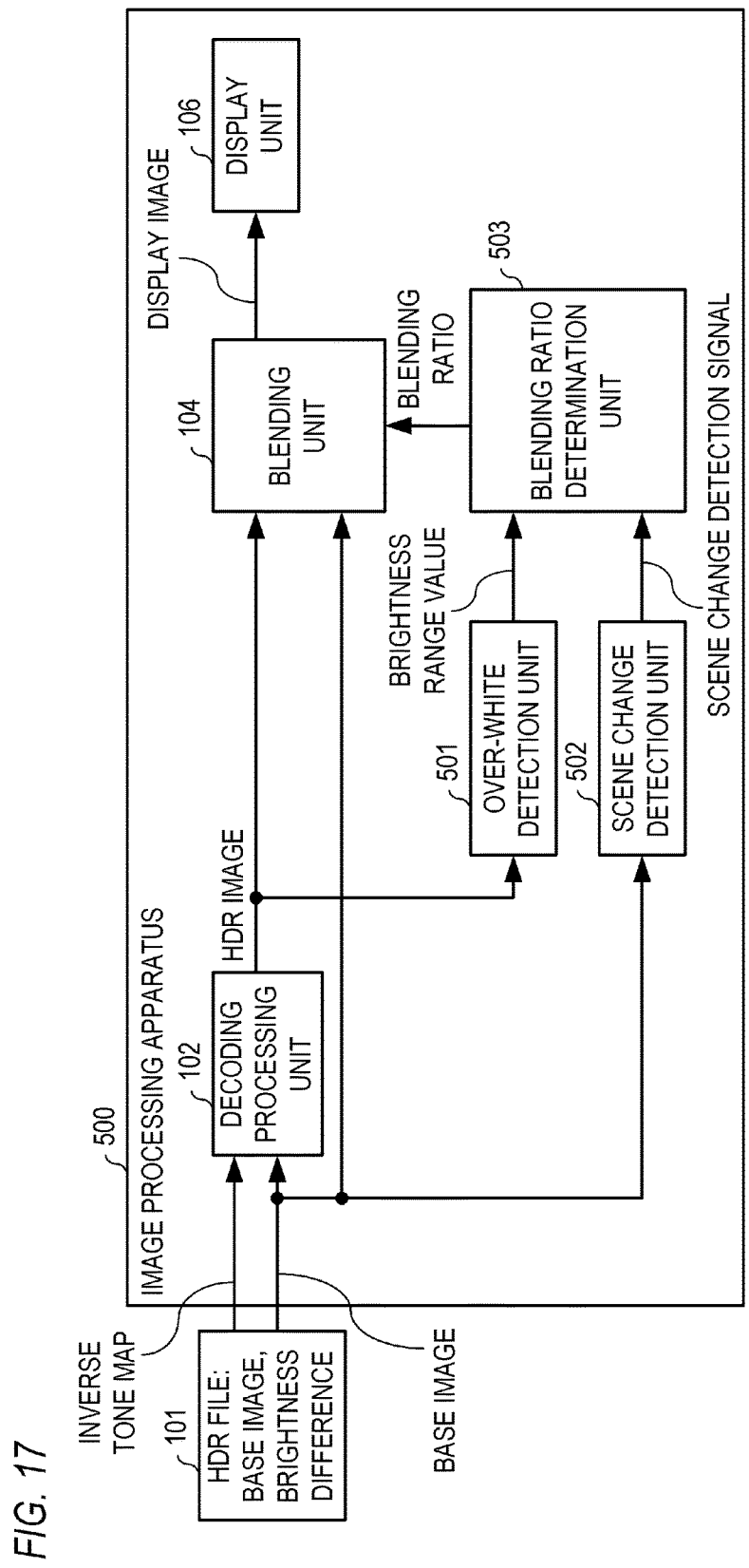
FIG. 17 is a view showing an example of a functional configuration of an image processing apparatus according to a fifth embodiment.

FIG. 17 is a block diagram showing an example of a functional configuration of an image processing apparatus 500 according to this embodiment.

As shown in FIG. 17, the image processing apparatus 500 includes the decoding processing unit 102, the blending unit 104, the display unit 106, an over-white detection unit 501, a scene change detection unit 502, a blending ratio determination unit 503, and so on.

Note that in FIG. 17, identical functional units and data to the first embodiment (FIG. 1) have been allocated identical reference symbols to the first embodiment, and description thereof has been omitted.

The HDR file 101 is input into the image processing apparatus 500.

In this embodiment, an example in which moving image data are processed will be described. More specifically, an example in which the base image data and the brightness difference data are obtained for each frame of the moving image data will be described. Further, in this embodiment, similarly to the first embodiment, an example of a case in which the brightness difference data included in the HDR file 101 are constituted by an inverse tone map will be described.

Note that the brightness difference data may be obtained for each scene of the moving image data.

A data file including the HDR image data and the brightness difference data may be input into the image processing apparatus 500 instead of the HDR file 101. In this case, the decoding processing unit 102 is not required.

The over-white detection unit 501 determines the brightness range value YR for each frame in accordance with the brightness of the HDR image data output by the decoding processing unit 102. The over-white detection unit 501 then outputs the brightness range value YR.

When an extremely bright display image is displayed suddenly, a large and sudden stimulus is applied to the eyes of the user, which is undesirable.

Hence, in this embodiment, the over-white detection unit 501 obtains a steadily smaller brightness range value as the HDR image data increase in brightness. More specifically, the over-white detection unit 501 determines whether the brightness of the HDR image data is "extremely dazzling", "dazzling", "bright", or "brighter than the base image data". The over-white detection unit 501 then obtains 0, 1, 2, or 3 as the brightness range value YR in accordance with the determination result indicating the brightness of the HDR image data. "Extremely dazzling" is brighter than "dazzling", "dazzling" is brighter than "bright", and "bright" is brighter than "brighter than the base image data". When the determination result indicates "extremely dazzling", YR=0 is obtained. When the determination result indicates "dazzling", YR=1 is obtained. When the determination result indicates "bright", YR=2 is obtained. When the determination result indicates "brighter than the base image data", YR=3 is obtained.

Note that the number of brightness indices and the number of values that can be obtained as the brightness range value YR may be larger or smaller than four.

The scene change detection unit 502 detects a scene change in the base image data on the basis of the base image data. More specifically, the scene change detection unit 502 records the base image data of each frame in the storage unit, not shown in the drawings. The scene change detection unit 502 then determines, in relation to each frame, whether or not a scene change has occurred between a previous frame recorded in the storage unit and a current frame on the basis of a difference between the base image data of the previous frame and the base image data of the current frame. The current frame refers to a currently displayed frame, and the previous frame refers to a frame immediately preceding the current frame. The scene change detection unit 502 outputs a scene change detection signal SC=1 when a scene change is detected, and outputs a scene change detection signal SC=0 when a scene change is not detected.

Note that the method of detecting a scene change is not limited to the method described above. For example, a scene change in the base image data may be detected on the basis of the HDR image data. Further, when the brightness difference data are obtained for each scene, a scene change may be determined to have occurred at an acquisition timing of the brightness difference data. When meta data indicating scene changes are included in the HDR file 101, a scene change may be detected using the meta data.

The blending ratio determination unit 503 determines the blending ratio Blend on the basis of the brightness range value YR and the scene change detection signal SC. The blending ratio determination unit 503 then outputs the blending ratio Blend.

Figure 18:
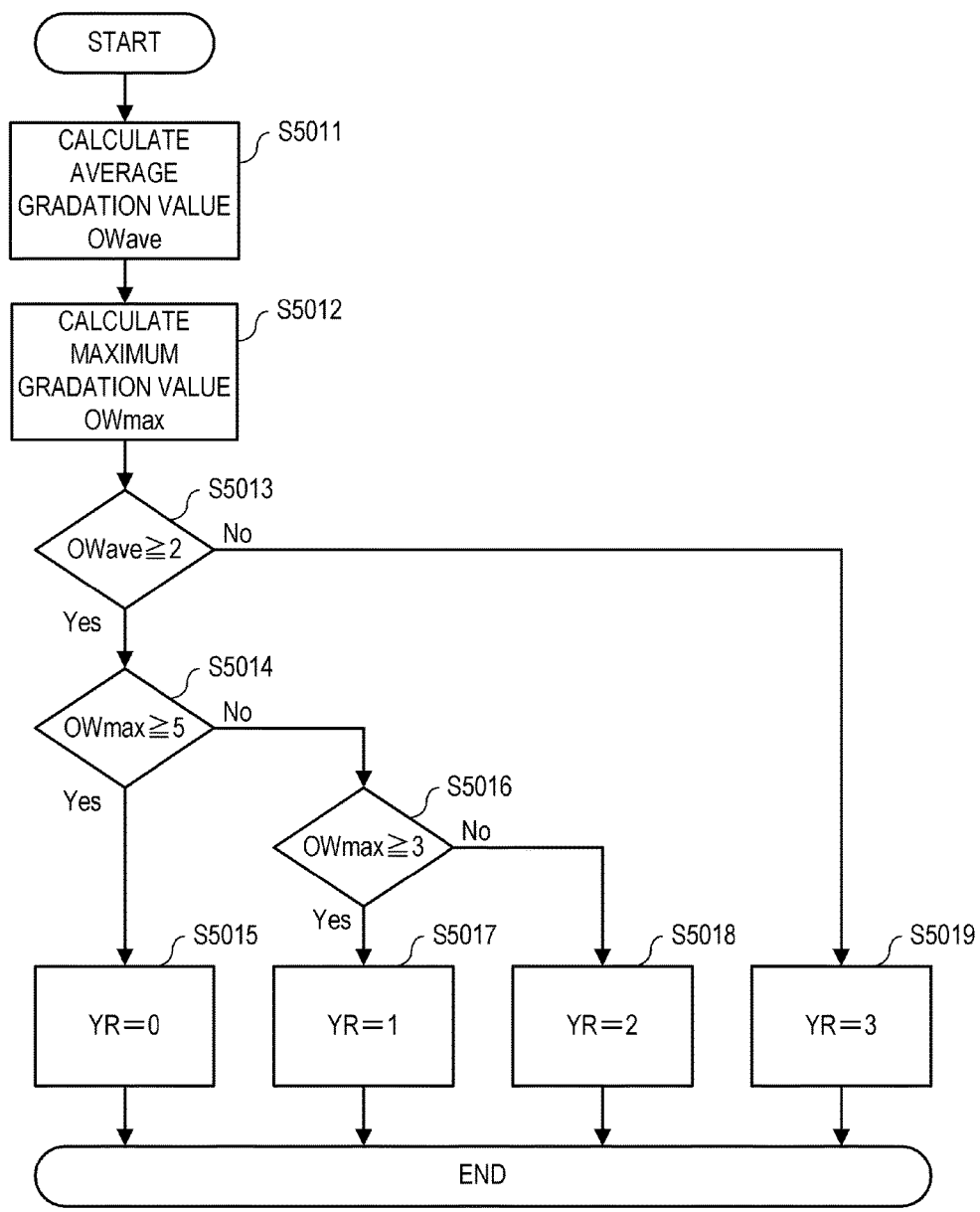
FIG. 18 is a view showing an example of a flow of processing executed by an over-white detection unit according to the fifth embodiment.

Using FIG. 18, an example of a flow of processing performed by the over-white detection unit 501 will be described. FIG. 18 is a flowchart showing an example of a flow of the processing performed by the over-white detection unit 501. The over-white detection unit 501 repeats the flowchart shown in FIG. 18 for each frame.

First, the over-white detection unit 501 calculates an average gradation value (an average value of the gradation values) OWave of the pixels in the over-white region, among the pixels of the HDR image data (S5011). The pixels in the over-white region are pixels having a larger gradation value HI than 1.0.

Next, the over-white detection unit 501 detects a maximum gradation value (a maximum value of the gradation values) OWmax of the pixels in the over-white region, among the pixels of the HDR image data (S5012).

The over-white detection unit 501 then determines whether or not the average gradation value OWave equals or exceeds a threshold A (S5013). When the average gradation value OWave equals or exceeds the threshold A, the processing advances to S5014, and when the average gradation value OWave is smaller than the threshold A, the processing advances to S5019. In this embodiment, 2 is used as the threshold A.

Note that the threshold A may be a value determined in advance by a manufacturer or the like, or a value that can be modified by the user.

In S5014, the over-white detection unit 501 determines whether or not the maximum gradation value OWmax equals or exceeds a threshold B1. When the maximum gradation value OWmax equals or exceeds the threshold B1, the processing advances to S5015, and when the maximum gradation value OWmax is smaller than the threshold B1, the processing advances to S5016. In this embodiment, 5 is used as the threshold B1.

Note that the threshold B1 may be a value determined in advance by the manufacturer or the like, or a value that can be modified by the user.

In S5016, the over-white detection unit 501 determines whether or not the maximum gradation value OWmax equals or exceeds a threshold B2. When the maximum gradation value OWmax equals or exceeds the threshold B2, the processing advances to S5017, and when the maximum gradation value OWmax is smaller than the threshold B2, the processing advances to S5018. In this embodiment, 3 is used as the threshold B2.

Note that the threshold B2 may be a value determined in advance by the manufacturer or the like, or a value that can be modified by the user.

In S5015, the over-white detection unit 501 determines that the brightness of the HDR image data is "extremely dazzling", and outputs 0 as the brightness range value YR.

In S5017, the over-white detection unit 501 determines that the brightness of the HDR image data is "dazzling", and outputs 1 as the brightness range value YR.

In S5018, the over-white detection unit 501 determines that the brightness of the HDR image data is "bright", and outputs 2 as the brightness range value YR.

In S5019, the over-white detection unit 501 determines that the brightness of the HDR image data is "brighter than the base image data", and outputs 3 as the brightness range value YR.

Note that the method of determining the brightness range value YR is not limited to the method described above.

For example, the brightness range value YR may be determined using only one of the average gradation value OWave and the maximum gradation value OWmax. When the average gradation value OWave is equal to or smaller than a threshold A1, 3 may be obtained as the brightness range value YR, and when the average gradation value OWave is larger than the threshold A1 and equal to or smaller than a threshold A2, 2 may be obtained as the brightness range value YR. Further, when the average gradation value OWave is larger than the threshold A2 and equal to or smaller than a threshold A3, 1 may be obtained as the brightness range value YR, and when the average gradation value OWave is larger than the threshold A3, 0 may be obtained as the brightness range value YR.

Furthermore, the brightness range value YR may be determined on the basis of a total number of pixels in the over-white region of the HDR image data. More specifically, a steadily smaller brightness range value YR may be obtained as the total number of pixels in the over-white region increases.

Figure 19:
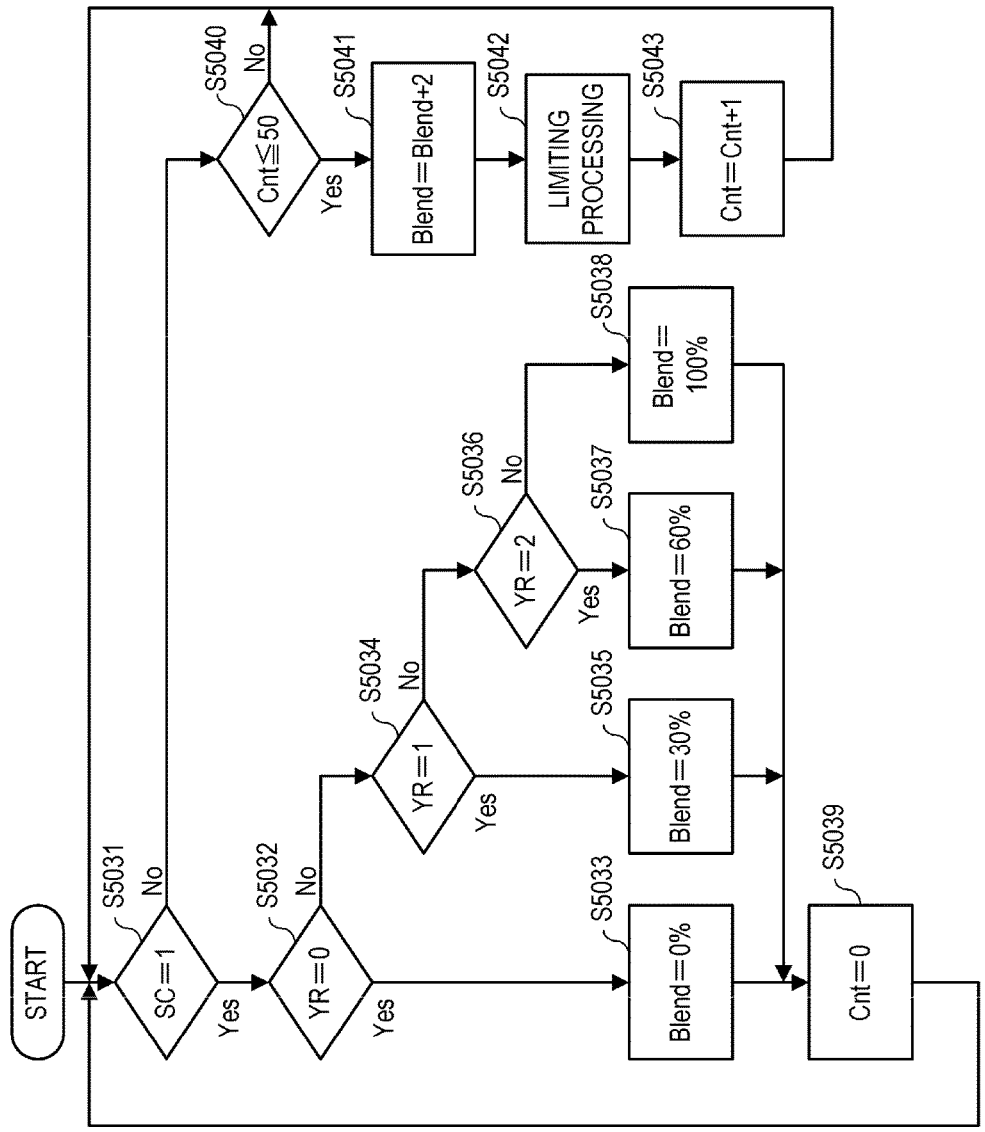
FIG. 19 is a view showing an example of a flow of processing executed by a blending ratio determination unit according to the fifth embodiment.

Using FIG. 19, an example of a flow of processing performed by the blending ratio determination unit 503 will be described. FIG. 19 is a flowchart showing an example of a flow of the processing performed by the blending ratio determination unit 503.

First, the blending ratio determination unit 503 determines whether or not the scene change detection signal SC output by the scene change detection unit 502 is at 1 (S5031). When the scene change detection signal SC is at 1, the processing advances to S5032, and when the scene change detection signal SC is at 0, the processing advances to S5040.

In S5032, the blending ratio determination unit 503 determines whether or not the brightness range value YR output by the over-white detection unit 501 is at 0. When the brightness range value YR is at 0, the processing advances to S5033, and when the brightness range value YR is not at 0, the processing advances to S5034.

In S5034, the blending ratio determination unit 503 determines whether or not the brightness range value YR is at 1. When the brightness range value YR is at 1, the processing advances to S5035, and when the brightness range value YR is not at 1, the processing advances to S5036.

In S5036, the blending ratio determination unit 503 determines whether or not the brightness range value YR is at 2. When the brightness range value YR is at 2, the processing advances to S5037, and when the brightness range value YR is at 3, the processing advances to S5038.

In S5033, the blending ratio determination unit 503 outputs 0% as the blending ratio Blend. As a result, identical image data to the base image data are generated as the display-image data (=the combined image data) immediately following a scene change. The processing then advances to S5039.

In S5035, the blending ratio determination unit 503 outputs 30% as the blending ratio Blend. As a result, image data obtained by combining the base image data and the HDR image data at a weighting of base image data:HDR image data=30%:70% are generated as the display-image data immediately following a scene change. The processing then advances to S5039.

In S5037, the blending ratio determination unit 503 outputs 60% as the blending ratio Blend. As a result, image data obtained by combining the base image data and the HDR image data at a weighting of base image data:HDR image data=60%:40% are generated as the display-image data immediately following a scene change. The processing then advances to S5039.

In S5038, the blending ratio determination unit 503 outputs 100% as the blending ratio Blend. As a result, identical image data to the HDR image data are generated as the display-image data (=the combined image data) immediately following a scene change. The processing then advances to S5039.

In S5039, the blending ratio determination unit 503 resets a count value Cnt of a number of frames in a scene following the scene change to 0. The processing subject frame is then switched to the next frame, whereupon the processing returns to S5031.

In S5040, the blending ratio determination unit 503 determines whether or not the count value Cnt is equal to or smaller than a threshold C. When the count value Cnt is equal to or smaller than the threshold C, the processing advances to S5041, and when the count value Cnt is larger than the threshold C, the processing subject frame is switched to the next frame, whereupon the processing returns to S5031. In this embodiment, 50 is used as the threshold C.

Note that the threshold C may be a value determined in advance by the manufacturer or the like, or a value that can be modified by the user.

In S5041, the blending ratio determination unit 503 calculates the blending ratio Blend of the current frame by adding an addition value D to the blending ratio Blend of the previous frame. In this embodiment, 2% is used as the addition value D.

Note that the addition value D may be a value determined in advance by the manufacturer or the like, or a value that can be modified by the user.

The method of determining the blending ratio Blend of the current frame is not limited to the method described above. For example, the blending ratio Blend of the current frame may be calculated by multiplying a coefficient (>1) by the blending ratio Blend of the previous frame.

Next, when the blending ratio Blend calculated in S5041 is larger than an upper limit value (100%), the blending ratio determination unit 503 performs limiting processing to limit the blending ratio Blend to 100% (S5042). The blending ratio determination unit 503 then outputs the blending ratio Blend. When the blending ratio Blend calculated in S5041 is equal to or smaller than the upper limit value (100%), the blending ratio determination unit 503 outputs the blending ratio Blend calculated in S5041. When the blending ratio Blend calculated in S5041 is larger than the upper limit value (100%), 100% s output as the blending ratio Blend.

The blending ratio determination unit 503 then increments the count value Cnt by 1 (S5043). The processing subject frame is then switched to the next frame, whereupon the processing returns to S5031.

In this embodiment, the processing of S5040 to S5043 is performed repeatedly following a scene change. As a result, the display-image data of each frame following the scene change are generated such that the display-image data change gradually from display-image data based on the brightness range value YR to display-image data that are identical to the HDR image data.

Using FIGS. 20A to 20E, the display-image data according to this embodiment and the dynamic range thereof will be described in more detail.

FIGS. 20A to 20E are views showing examples of image data and dynamic ranges (brightness ranges) thereof according to this embodiment. In FIGS. 20A to 20E, numerals depicted on the image data (the images represented by the image data) indicate the gradation values of the regions in which the numerals are depicted.

Figure 20A:
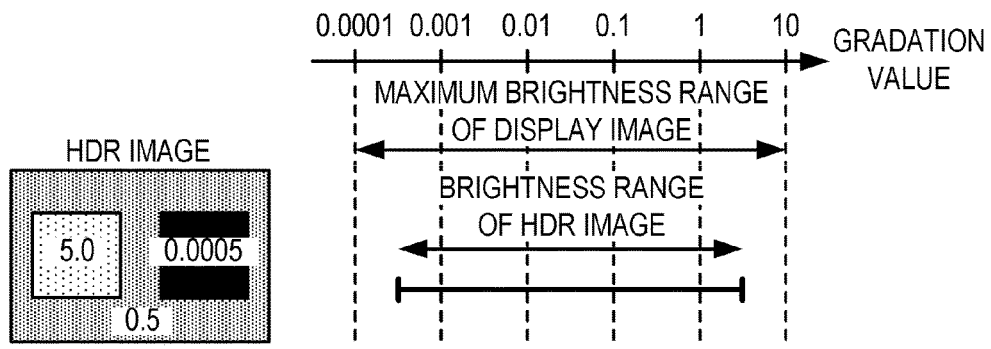
FIGS. 20A to 20E are views showing examples of image data and dynamic ranges thereof according to the fifth embodiment.

FIG. 20A shows the HDR image data and the dynamic range thereof.

Figure 20B:
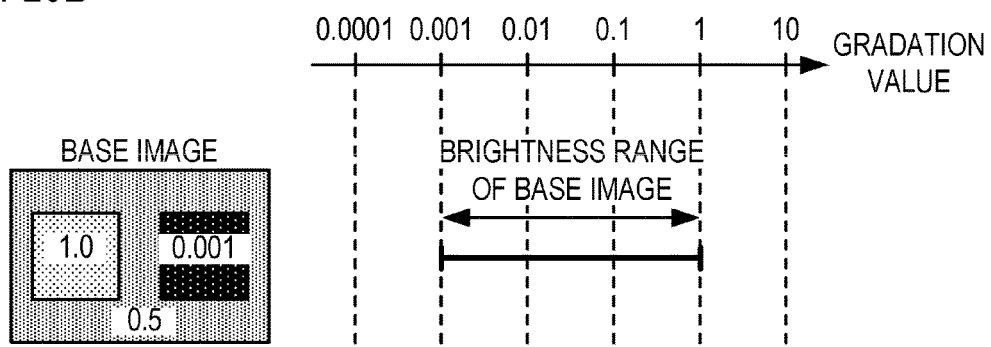

FIG. 20B shows the base image data and the dynamic range thereof.

Figure 20C:
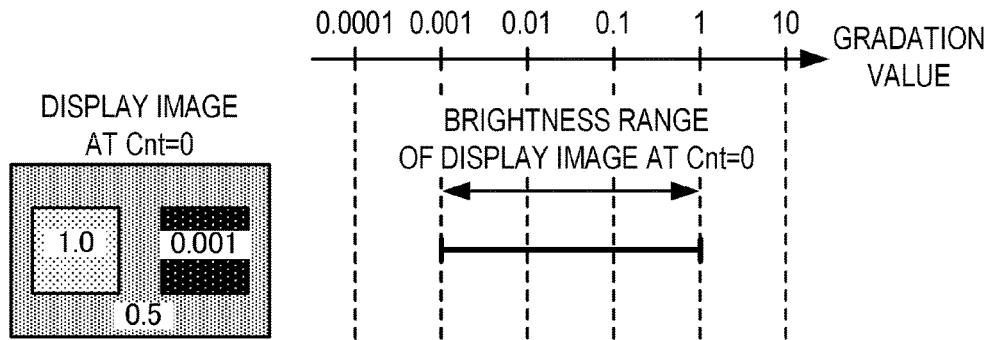

FIG. 20C shows the display-image data of a frame (a scene change frame) immediately following a scene change, and the dynamic range thereof.

Figure 20D:
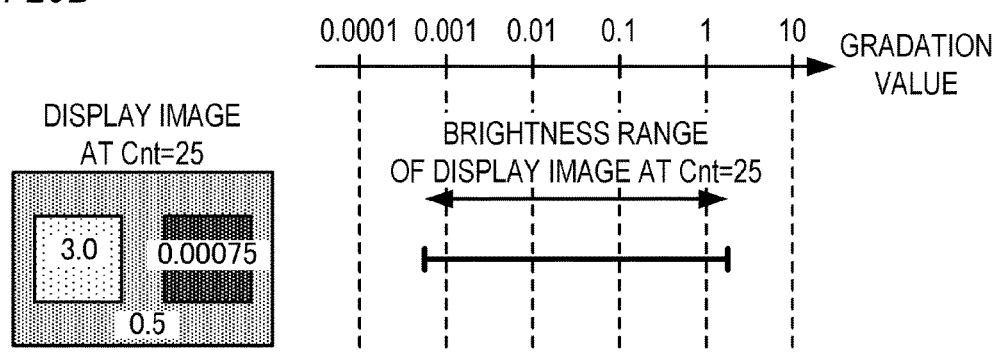

FIG. 20D shows the display-image data of a frame positioned 25 frames after the scene change frame, and the dynamic range thereof.

Figure 20E:
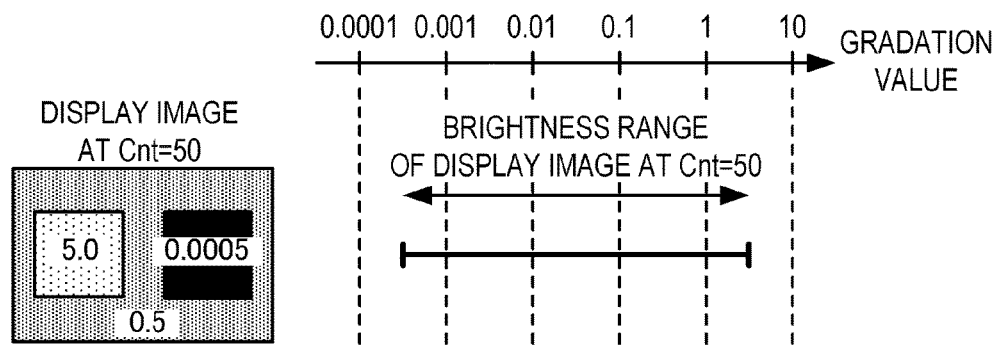

FIG. 20E shows the display-image data of a frame positioned 50 frames after the scene change frame, and the dynamic range thereof.

When the HDR image data shown in FIG. 20A are used, 5 is calculated as the average gradation value OWave in S5011 of FIG. 18, and 5 is calculated as the maximum gradation value OWmax in S5012 of FIG. 18. As a result, the brightness of the HDR image data is determined to be "extremely dazzling", and therefore 0 is set as the brightness range value YR.

When the HDR image data shown in FIG. 20A are obtained as the HDR image data immediately following a scene change, 0% is set as the blending ratio Blend in S5033 of FIG. 19. As a result, as shown in FIG. 20C, identical image data to the base image data are generated as the display-image data immediately following the scene change.

Thereafter, the blending ratio Blend is gradually increased by performing the processing of S5040 to S5043 repeatedly. As a result, as shown in FIGS. 20C to 20E, the dynamic range of the display-image data gradually expands to the dynamic range of the HDR image data.

For example, in the frame positioned 25 frames after the scene change frame, the display-image data are generated using 50% as the blending ratio Blend. Accordingly, display-image data obtained by combining the base image data and the HDR image data at a weighting of base image data:HDR image data=50%:50% are generated. As a result, as shown in FIG. 20C, a value of ½ a value obtained by adding the minimum gradation value of the dynamic range of the HDR image data to the minimum gradation value of the dynamic range of the base image data is set as the minimum gradation value of the dynamic range of the display-image data. Further, as shown in FIG. 20C, a value of ½ a value obtained by adding the maximum gradation value of the dynamic range of the HDR image data to the maximum gradation value of the dynamic range of the base image data is set as the maximum gradation value of the dynamic range of the display-image data.

Furthermore, in the frame positioned 50 frames after the scene change frame, the display-image data are generated using 100% as the blending ratio Blend. As a result, as shown in FIG. 20E, identical image data to the HDR image data are generated as the display-image data.

In the example shown in FIGS. 20C to 20E, 0 is set as the brightness range value YR, and therefore the dynamic range of the display-image data gradually expands to the dynamic range of the HDR image data over 50 frames.

When the brightness range value YR is at 1, the dynamic range of the display-image data gradually expands to the dynamic range of the HDR image data over 35 frames.

When the brightness range value YR is at 2, the dynamic range of the display-image data gradually expands to the dynamic range of the HDR image data over 20 frames.

When the brightness range value YR is at 3, identical image data to the HDR image data are generated as the display-image data of the frame immediately following the scene change.

According to this embodiment, as described above, the display-image data are generated on the basis of the brightness range value YR, which decreases steadily as the HDR image data increase in brightness, immediately after a scene change. The display-image data of each frame following the scene change are then generated such that the display-image data change gradually from display-image data based on the brightness range value YR to display-image data that are identical to the HDR image data. In so doing, the dynamic range of the display-image data can be adjusted favorably. More specifically, the dynamic range can be adjusted without undergoing rapid change. As a result, a display image having a wide dynamic range can be shown to the user without applying a large and sudden stimulus to the eyes of the user.

Note that in this embodiment, an example in which the brightness range value YR is obtained for each frame was described, but the present invention is not limited thereto, and instead, for example, the brightness range value YR may be obtained only in relation to the frame immediately following the scene change.

The processing for detecting a scene change and gradually modifying the display-image data from display-image data based on the brightness range value YR to display-image data that are identical to the HDR image data need not be performed. As long as the display-image data are generated on the basis of the brightness range value YR that is set to decrease steadily as the HDR image data increase in brightness, the dynamic range can be adjusted without undergoing rapid change. As a result, application of a large and sudden stimulus to the eyes of the user can be suppressed.

Note that the brightness difference data are not limited to an inverse tone map, and instead, for example, the brightness difference data may be constituted by brightness ratio data.

Also note that the method of generating the display-image data on the basis of the brightness range value YR is not limited to the method described above, and instead, for example, the display-image data may be generated using one of the methods described in the first to fourth embodiments.

(Sixth Embodiment)

An image processing apparatus and an image processing method according to a sixth embodiment of the present invention will be described below.

In the first to fifth embodiments, examples in which an HDR file is input into the image processing apparatus were described.

In this embodiment, an example in which the HDR image data are input into the image processing apparatus without inputting an HDR file into the image processing apparatus will be described.

Figure 21:
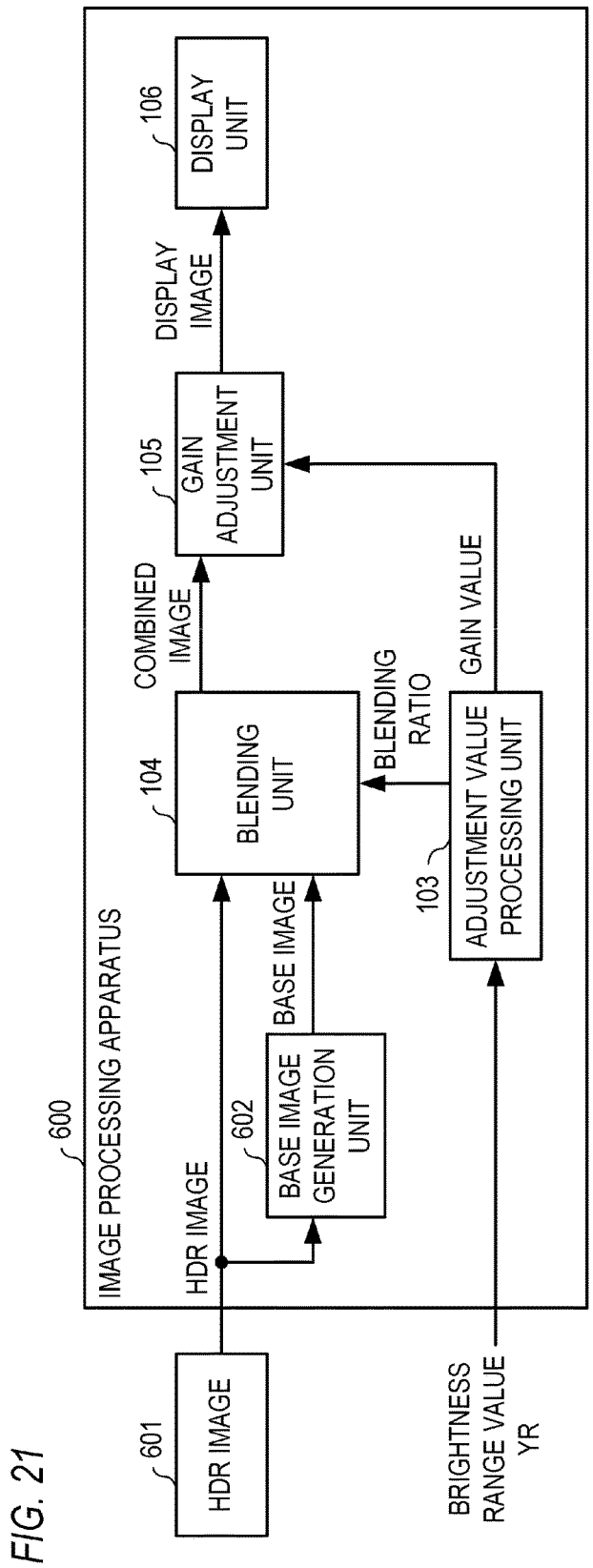
FIG. 21 is a view showing an example of a functional configuration of an image processing apparatus according to a sixth embodiment.

FIG. 21 is a block diagram showing an example of a functional configuration of an image processing apparatus 600 according to this embodiment. As shown in FIG. 21, the image processing apparatus 600 according to the sixth embodiment includes the adjustment value processing unit 103, the blending unit 104, the gain adjustment unit 105, the display unit 106, a base image generation unit 602, and so on.

Note that in FIG. 21, identical functional units and data to the first embodiment (FIG. 1) have been allocated identical reference symbols to the first embodiment, and description thereof has been omitted.

HDR image data 601 and the brightness range value YR are input into the image processing apparatus 600.

The base image generation unit 602 generates the base image data on the basis of the HDR image data 601. In other words, the base image generation unit 602 converts the HDR image data 601 into the base image data.

Figure 22:
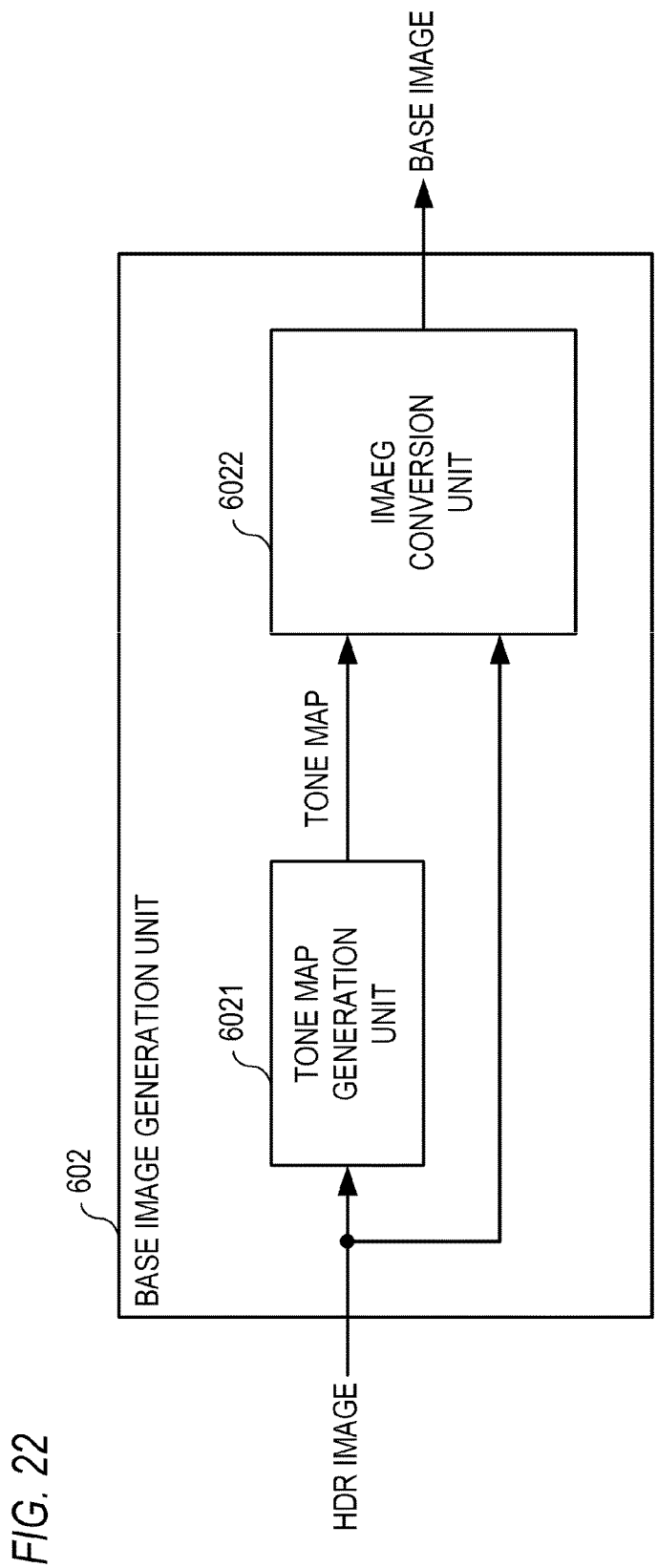
FIG. 22 is a view showing an example of a functional configuration of a base image generation unit according to the sixth embodiment.

FIG. 22 is a block diagram showing an example of a functional configuration of the base image generation unit 602. As shown in FIG. 22, the base image generation unit 602 includes a tone map generation unit 6021, an image conversion unit 6022, and so on.

The tone map generation unit 6021 generates the brightness difference data expressing the correspondence relationship between the gradation values of the HDR image data and the gradation values of the base image data on the basis of the HDR image data 601. In this embodiment, a tone map for converting the gradation values of the HDR image data into the gradation values of the base image data is generated.

First, the tone map generation unit 6021 generates a gradation histogram expressing a number of pixels of each gradation value from the HDR image data 601.

Next, the tone map generation unit 6021 generates a cumulative histogram by cumulatively adding frequencies of the gradation histogram from the low gradation side.

The tone map generation unit 6021 then normalizes the frequencies of the cumulative histogram so that a minimum value of the frequencies of the cumulative histogram matches the base minimum value and a maximum value of the frequencies of the cumulative histogram matches the base maximum value. Through this normalization, the frequencies of the cumulative histogram are converted into the gradation values of the base image data. As a result, the tone map for converting the HDR image data into the base image data is generated.

Note that the base minimum value and the base maximum value are obtained from a control unit, not shown in the drawings.

The image conversion unit 6022 converts the HDR image data 601 into the base image data using the tone map generated by the tone map generation unit 6021.

According to this embodiment, as described above, the brightness difference data and the base image data are generated on the basis of the HDR image data. As a result, identical processing to the processing described in the first to fifth embodiments can be executed as generation processing for generating the display-image data even when an HDR file is not input into the image processing apparatus and only the HDR image data are input into the image processing apparatus. In other words, the display-image data can be generated on the basis of at least two of the HDR image data, the base image data, and the brightness difference data.

Note that in this embodiment, an example in which the brightness difference data are generated on the basis of the HDR image data was described, but the present invention is not limited thereto, and instead, for example, the brightness difference data may be recorded in advance in the storage unit.

Further, in this embodiment, an example in which the tone map for converting the HDR image data into the base image data is generated from the minimum value and the maximum value of the frequencies of a cumulative histogram was described, but the present invention is not limited thereto, and instead, for example, the tone map may be generated in accordance with an arbitrary set value input by the user. More specifically, when a set value of "contrast: high" is set, a tone map for converting the HDR image data into image data having a higher contrast (a larger difference between light and dark) than the base image data may be generated. Further, when a set value of "contrast: low" is set, a tone map for converting the HDR image data into image data having a lower contrast (a smaller difference between light and dark) than the base image data may be generated.

<Other Embodiments>

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-116603, filed on Jun. 5, 2014, and Japanese Patent Application No. 2014-231639, filed on Nov. 14, 2014, which are hereby incorporated by reference herein in their entirety.

What is claimed is:

1. An image processing apparatus comprising: one or more processors; and one or more memories storing a program which, when executed by the one or more processors, causes the image processing apparatus to execute:

obtaining a brightness range value used during processing for adjusting a dynamic range of display-image data; and generating the display-image data on the basis of the obtained brightness range value, using two or more of first image data, second image data having a dynamic range wider than a dynamic range of the first image data, and brightness difference data expressing a correspondence relationship between gradation values of the first image data and gradation values of the second image data, wherein in the generating, when the obtained brightness range value is within a predetermined range, the image processing apparatus generates the display-image data such that the dynamic range thereof becomes steadily narrower as the obtained brightness range value decreases and a maximum gradation value of the dynamic range thereof steadily approaches a maximum gradation value of the dynamic range of the first image data as the obtained brightness range value decreases.

2. The image processing apparatus according to claim 1, wherein the predetermined range is a range from a first value to a second value which is smaller than the first value, and in the generating, the image processing apparatus generates the display-image data to be identical to the second image data when the obtained brightness range value is a first value.

3. The image processing apparatus according to claim 2, wherein in the generating, the image processing apparatus generates the display-image data to be identical to the first image data when the obtained brightness range value is the second value.

4. The image processing apparatus according to claim 2, wherein in the generating, the image processing apparatus generates the display-image data such that the maximum gradation value of the dynamic range thereof increases steadily as the obtained brightness range value increases when the obtained brightness range value is larger than the first value.

5. The image processing apparatus according to claim 2, wherein in the generating, the image processing apparatus generates the display-image data such that the maximum gradation value of the dynamic range thereof decreases steadily as the obtained brightness range value decreases when the obtained brightness range value is smaller than the second value.

6. The image processing apparatus according to claim 2, wherein in the generating, the image processing apparatus generates the display-image data by combining the gradation values of the first image data with the gradation values of the second image data at a weighting that corresponds to the obtained brightness range value when the obtained brightness range value is equal to or smaller than the first value and equal to or larger than the second value.

7. The image processing apparatus according to claim 6, wherein in the generating, a weighting, at which the display-image data is generated so as to approach the second image data steadily as the obtained brightness range value increases and so as to approach the first image data steadily as the obtained brightness range value decreases when the obtained brightness range value is equal to or smaller than the first value and equal to or larger than the second value, is used.

8. The image processing apparatus according to claim 1, wherein in the generating, the image processing apparatus generates combined image data by combining the gradation values of the first image data with the gradation values of the second image data at a weighting that corresponds to the obtained brightness range value, and the image processing apparatus generates the display-image data by correcting gradation values of the combined image data using a correction value that corresponds to the obtained brightness range value.

9. The image processing apparatus according to claim 2, wherein in the generating, the image processing apparatus generates the display-image data by performing processing on respective pixels thereof to combine the gradation values of the first image data with the gradation values of the second image data at a weighting that corresponds to combinations of the obtained brightness range value and the gradation values of the second image data when the obtained brightness range value is equal to or smaller than the first value and equal to or larger than the second value.

10. The image processing apparatus according to claim 1, wherein in the generating, the image processing apparatus generates combined image data by performing processing on respective pixels thereof to combine the gradation values of the first image data with the gradation values of the second image data at a weighting that corresponds to combinations of the obtained brightness range value and the gradation values of the second image data, and the image processing apparatus generates the display-image data by correcting gradation values of the combined image data using a correction value that corresponds to the obtained brightness range value.

11. The image processing apparatus according to claim 2, wherein in the generating, the image processing apparatus generates corrected brightness difference data expressing a correspondence relationship between the gradation values of the first image data and gradation values of the display-image data by correcting the gradation values of the second image data, which are expressed by the brightness difference data, on the basis of the obtained brightness range value, and the image processing apparatus generates the display-image data by converting the gradation values of the first image data into the gradation values of the display-image data using the corrected brightness difference data.

12. The image processing apparatus according to claim 2, wherein in the generating, the image processing apparatus generates corrected brightness difference data expressing a correspondence relationship between the gradation values of the second image data and gradation values of the display-image data by correcting the gradation values of the first image data, which are expressed by the brightness difference data, on the basis of the obtained brightness range value, and the image processing apparatus generates the display-image data by converting the gradation values of the second image data into the gradation values of the display-image data using the corrected brightness difference data. data by converting the gradation values of the first image data into the gradation values of the display-image data using the corrected brightness difference data.

13. The image processing apparatus according to claim 1, wherein in the obtaining of the brightness range value, a steadily smaller brightness range value as the second image data increase in brightness is obtained.

14. The image processing apparatus according to claim 1, wherein in the obtaining of the brightness range value, a brightness range value corresponding to a user operation is obtained.

15. An image processing method comprising: an obtaining step of obtaining a brightness range value used during processing for adjusting a dynamic range of display-image data; and a generating step of generating the display-image data on the basis of the brightness range value obtained in the obtaining step, using two or more of first image data, second image data having a dynamic range wider than a dynamic range of the first image data, and brightness difference data expressing a correspondence relationship between gradation values of the first image data and gradation values of the second image data, wherein, in the generating step, when the brightness range value obtained in the obtaining step is within a predetermined range, the display-image data is generated such that the dynamic range thereof becomes steadily narrower as the brightness range value obtained in the obtaining step decreases and a maximum gradation value of the dynamic range thereof steadily approaches a maximum gradation value of the dynamic range of the first image data as the brightness range value obtained in the obtaining step decreases.

16. The image processing apparatus according to claim 1, wherein the number bits of the first image data is smaller than the number bits of the second image data.

17. An image processing apparatus comprising: one or more processors; and one or more memories storing a program which, when executed by the one or more processors, causes the image processing apparatus to execute: obtaining a brightness range value used during processing for adjusting a dynamic range of display-image data; and generating the display-image data on the basis of the obtained brightness range value, using first image data and second image data having a dynamic range wider than a dynamic range of the first image data, wherein in the generating, when the obtained brightness range value is within a predetermined range, the image processing apparatus generates the display-image data such that when the obtained brightness range value becomes smaller, (1) the dynamic range of the display-image data becomes narrower, and (2) the difference between a maximum gradation value of the dynamic range of the display-image data and a maximum gradation value of the dynamic range of the first image data becomes smaller.

18. The image processing apparatus according to claim 17, wherein the predetermined range is a range from a first value to a second value which is smaller than the first value, and in the generating, the image processing apparatus generates the display-image data to be identical to the second image data when the obtained brightness range value is a first value.

19. The image processing apparatus according to claim 18, wherein in the generating, the image processing apparatus generates the display-image data to be identical to the first image data when the obtained brightness range value is the second value.

20. The image processing apparatus according to claim 18, wherein in the generating, the image processing apparatus generates the display-image data by combining the gradation values of the first image data with the graduation values of the second image data at a weighting that corresponds to the obtained brightness range value when the obtained brightness range value is equal to or smaller than the first value and equal to or larger than the second value.

21. The image processing apparatus according to claim 17, wherein the number bits of the first image data is smaller than the number bits of the second image data.

22. An image processing apparatus comprising: one or more processors; and one or more memories storing a program which, when executed by the one or more processors, causes the image processing apparatus to execute: obtaining a brightness range value used during processing for adjusting a dynamic range of display-image data; and generating the display-image data on the basis of the obtained brightness range value, using first image data and brightness difference data expressing a correspondence relationship between gradation values of the first image data and gradation values of second image data having a dynamic range wider than a dynamic range of the first image data, wherein in the generating, when the obtained brightness range value is within a predetermined range, the image processing apparatus generates the display-image data such that when the obtained brightness range value becomes smaller, (1) the dynamic range of the display-image data becomes narrower, and (2) the difference between a maximum gradation value of the dynamic range of the display-image data and a maximum gradation value of the dynamic range of the first image data becomes smaller.

23. The image processing apparatus according to claim 22, wherein the predetermined range is a range from a first value to a second value which is smaller than the first value, and in the generating, the image processing apparatus generates the display-image data to be identical to the second image data when the obtained brightness range value is a first value.

24. The image processing apparatus according to claim 23, wherein in the generating, the image processing apparatus generates the display-image data to be identical to the first image data when the obtained brightness range value is the second value.

25. The image processing apparatus according to claim 23, wherein in the generating, the image processing apparatus generates corrected brightness difference data expressing a correspondence relationship between the gradation values of the first image data and gradation values of the display-image data by correcting the gradation values of the second image data, which are expressed by the brightness difference data, on the basis of the obtained brightness range value, and the image processing apparatus generates the display-image data by converting the gradation values of the first image data into the gradation values of the display-image data using the corrected brightness difference data.

26. The image processing apparatus according to claim 22, wherein the number bits of the first image data is smaller than the number bits of the second image data.

* * * * *